US008611464B2

(12) United States Patent
Han et al.

(10) Patent No.: US 8,611,464 B2
(45) Date of Patent: *Dec. 17, 2013

(54) METHOD AND APPARATUS FOR INFORMATION TRANSMISSION IN A RADIO COMMUNICATION SYSTEM

(71) Applicant: LG Electronics Inc., Seoul (KR)

(72) Inventors: Seung Hee Han, Anyang-si (KR); Moon Il Lee, Anyang-si (KR); Yeong Hyeon Kwon, Anyang-si (KR); Hyun Soo Ko, Anyang-si (KR); Ja Ho Koo, Anyang-si (KR); Dong Cheol Kim, Anyang-si (KR); Jae Hoon Chung, Anyang-si (KR); Sung Ho Moon, Anyang-si (KR); Jin Sam Kwak, Anyang-si (KR); Min Seok Noh, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,176

(22) Filed: Jan. 16, 2013

(65) Prior Publication Data

US 2013/0129013 A1 May 23, 2013

Related U.S. Application Data

(63) Continuation of application No. 13/058,395, filed as application No. PCT/KR2009/004479 on Aug. 11, 2009, now Pat. No. 8,385,467.

(60) Provisional application No. 61/087,737, filed on Aug. 11, 2008, provisional application No. 61/114,479, filed on Nov. 14, 2008, provisional application No. 61/115,113, filed on Nov. 17, 2008, provisional application No. 61/116,298, filed on Nov. 20, 2008, provisional application No. 61/117,237, filed on Nov. 24, 2008.

(30) Foreign Application Priority Data

Jul. 9, 2009 (KR) .......................... 10-2009-0062712

(51) Int. Cl.
*H04L 27/00* (2006.01)

(52) U.S. Cl.
USPC ............................................ 375/299; 375/295

(58) Field of Classification Search
USPC .......................................................... 375/299
See application file for complete search history.

(56) References Cited

U.S. PATENT DOCUMENTS 6,141,393 A * 10/2000 Thomas et al. ............... 375/347
7,620,096 B2 * 11/2009 Bar-Ness et al. ............. 375/144

(Continued)

FOREIGN PATENT DOCUMENTS

| CN | 1770658 A | 5/2006 |
| CN | 101006658 A | 7/2007 |

(Continued)

OTHER PUBLICATIONS

LG Electronics, "Uplink MIMO Transmission for LTE-Advanced," 3GPP TSG RAN WG1 Meeting #55, Prague, Czech Republic, Nov. 10-14, 2008, pp. 1-6, R1-084199.

(Continued)

*Primary Examiner* — Erin File
(74) *Attorney, Agent, or Firm* — Birch, Stewart, Kolasch & Birch, LLP

(57) ABSTRACT

A method of transmitting, by a transmitter, information in a wireless communication system, the method includes generating first and second symbols; generating first and second transmit vectors on the basis of an Alamouti code from the first and second symbols; and transmitting the first transmit vector through a first antenna and transmitting the second transmit vector through a second antenna. The first transmit vector consists of a first transmit symbol and a second transmit symbol. The second transmit vector consists of a third transmit symbol and a fourth transmit symbol. The first, second, third, and fourth transmit symbols are transmitted based on first and second resource indexes. The first symbol is a first modulation symbol for first information, and the second symbol is a second modulation symbol for second information.

16 Claims, 24 Drawing Sheets

(56) References Cited

U.S. PATENT DOCUMENTS

| | | | |
|---|---|---|---|
| 7,724,836 B2* | 5/2010 | Hartmann et al. | 375/285 |
| 8,116,277 B2 | 2/2012 | Lee et al. | |
| 8,238,320 B2 | 8/2012 | Kim et al. | |
| 8,249,608 B2 | 8/2012 | Heo et al. | |
| 8,331,305 B2 | 12/2012 | Wennstrom et al. | |
| 8,385,467 B2 | 2/2013 | Han et al. | |
| 2003/0235147 A1 | 12/2003 | Walton et al. | |
| 2005/0047387 A1 | 3/2005 | Frederiksen et al. | |
| 2005/0190728 A1 | 9/2005 | Han et al. | |
| 2006/0039496 A1 | 2/2006 | Chae et al. | |
| 2006/0077886 A1 | 4/2006 | Oh et al. | |
| 2006/0093066 A1 | 5/2006 | Jeong et al. | |
| 2006/0133530 A1 | 6/2006 | Kwak et al. | |
| 2006/0209754 A1 | 9/2006 | Ji et al. | |
| 2007/0014272 A1 | 1/2007 | Palanki et al. | |
| 2007/0036179 A1 | 2/2007 | Palanki et al. | |
| 2007/0183386 A1 | 8/2007 | Muharemovic et al. | |
| 2007/0189404 A1 | 8/2007 | Baum et al. | |
| 2008/0095252 A1 | 4/2008 | Kim et al. | |
| 2008/0117833 A1 | 5/2008 | Borran et al. | |
| 2008/0153425 A1 | 6/2008 | Heo et al. | |
| 2008/0165893 A1 | 7/2008 | Malladi et al. | |
| 2008/0186916 A1 | 8/2008 | Oshiba et al. | |
| 2008/0186918 A1 | 8/2008 | Tinnakornsrisuphap et al. | |
| 2008/0205348 A1 | 8/2008 | Malladi | |
| 2008/0212506 A1 | 9/2008 | Lee et al. | |
| 2008/0212514 A1 | 9/2008 | Chen | |
| 2008/0212555 A1 | 9/2008 | Kim et al. | |
| 2008/0227481 A1 | 9/2008 | Naguib et al. | |
| 2008/0232240 A1 | 9/2008 | Baum et al. | |
| 2008/0232449 A1 | 9/2008 | Khan et al. | |
| 2008/0233966 A1 | 9/2008 | Scheim et al. | |
| 2008/0253484 A1 | 10/2008 | Kakura et al. | |
| 2008/0273513 A1 | 11/2008 | Montojo et al. | |
| 2008/0273516 A1 | 11/2008 | Kim et al. | |
| 2008/0318608 A1 | 12/2008 | Inoue et al. | |
| 2009/0010240 A1 | 1/2009 | Papasakellariou et al. | |
| 2009/0028261 A1 | 1/2009 | Zhang et al. | |
| 2009/0034468 A1 | 2/2009 | Muharemovic et al. | |
| 2009/0046694 A1 | 2/2009 | Matsumoto et al. | |
| 2009/0060004 A1 | 3/2009 | Papasakellariou et al. | |
| 2009/0073955 A1 | 3/2009 | Malladi | |
| 2009/0092073 A1 | 4/2009 | Doppler et al. | |
| 2009/0092148 A1 | 4/2009 | Zhang et al. | |
| 2009/0186613 A1 | 7/2009 | Ahn et al. | |
| 2009/0196240 A1 | 8/2009 | Frederiksen et al. | |
| 2009/0196249 A1 | 8/2009 | Kawamura et al. | |
| 2009/0239476 A1 | 9/2009 | Womack et al. | |
| 2009/0245194 A1 | 10/2009 | Damnjanovic et al. | |
| 2009/0245212 A1 | 10/2009 | Sambhwani et al. | |
| 2009/0245284 A1 | 10/2009 | Xu et al. | |
| 2009/0268833 A1* | 10/2009 | Ariyavisitakul et al. | 375/262 |
| 2009/0276507 A1 | 11/2009 | Ahn et al. | |
| 2009/0276675 A1 | 11/2009 | Ojala et al. | |
| 2009/0280819 A1 | 11/2009 | Brisebois et al. | |
| 2009/0285160 A1 | 11/2009 | Cheng et al. | |
| 2009/0323617 A1 | 12/2009 | Che et al. | |
| 2009/0323625 A1 | 12/2009 | Lee et al. | |
| 2010/0061361 A1 | 3/2010 | Wu | |
| 2010/0091672 A1 | 4/2010 | Ishii | |
| 2010/0150081 A1 | 6/2010 | Gao et al. | |
| 2010/0150114 A1 | 6/2010 | Che | |
| 2010/0177741 A1 | 7/2010 | Zhang et al. | |
| 2010/0177804 A1 | 7/2010 | Kwak et al. | |
| 2010/0179862 A1 | 7/2010 | Chassin et al. | |
| 2010/0183104 A1* | 7/2010 | Alexander et al. | 375/346 |
| 2010/0195594 A1 | 8/2010 | Seo et al. | |
| 2010/0329220 A1 | 12/2010 | Kim et al. | |
| 2011/0009137 A1 | 1/2011 | Chung et al. | |
| 2011/0064164 A1 | 3/2011 | Seo et al. | |
| 2011/0103367 A1 | 5/2011 | Ishii | |
| 2011/0134861 A1 | 6/2011 | Seo et al. | |
| 2011/0158200 A1 | 6/2011 | Bachu et al. | |
| 2011/0194524 A1 | 8/2011 | Hedlund et al. | |
| 2011/0199997 A1 | 8/2011 | Wennstrom et al. | |
| 2011/0205928 A1 | 8/2011 | Pelletier et al. | |
| 2011/0211522 A1 | 9/2011 | Chung et al. | |
| 2011/0261729 A1 | 10/2011 | Ahn et al. | |
| 2011/0261895 A1* | 10/2011 | Zhang et al. | 375/267 |
| 2011/0268053 A1 | 11/2011 | Che et al. | |
| 2011/0274079 A1 | 11/2011 | Lee et al. | |
| 2011/0280203 A1 | 11/2011 | Han et al. | |
| 2011/0292900 A1 | 12/2011 | Ahn et al. | |
| 2012/0026966 A1 | 2/2012 | Wennstrom et al. | |
| 2012/0082113 A1 | 4/2012 | Lee et al. | |
| 2012/0083302 A1 | 4/2012 | Borran et al. | |
| 2012/0099546 A1 | 4/2012 | Cho et al. | |
| 2012/0177012 A1 | 7/2012 | Buckley et al. | |
| 2012/0236773 A1 | 9/2012 | Shen et al. | |
| 2012/0263250 A1 | 10/2012 | Yap et al. | |
| 2013/0016701 A1 | 1/2013 | Malladi et al. | |
| 2013/0129013 A1 | 5/2013 | Han et al. | |

FOREIGN PATENT DOCUMENTS

| | | |
|---|---|---|
| CN | 101006659 A | 7/2007 |
| CN | 101027867 A | 8/2007 |
| JP | 2004-524727 A | 8/2004 |
| JP | 2007-536830 A | 12/2007 |
| JP | 4511611 B2 | 5/2010 |
| JP | 2011-530941 A | 12/2011 |
| KR | 10-2005-0081552 A | 8/2005 |
| KR | 10-2006-0032765 A | 4/2006 |
| KR | 10-2007-0091889 A | 9/2007 |
| KR | 10-2007-0119958 A | 12/2007 |
| KR | 10-2008-0056621 A | 6/2008 |
| KR | 10-2008-0064756 A | 7/2008 |
| KR | 10-2008-0065562 A | 7/2008 |
| KR | 10-2008-0073616 A | 8/2008 |
| KR | 10-2008-0096088 A | 10/2008 |
| KR | 10-2008-0097360 A | 11/2008 |
| WO | WO 02/47278 A2 | 6/2002 |
| WO | WO 03/021795 A2 | 3/2003 |
| WO | WO 2006/001909 A2 | 1/2006 |
| WO | WO 2006/019253 A1 | 2/2006 |
| WO | WO 2006/039185 A1 | 4/2006 |
| WO | WO 2007/084988 A2 | 7/2007 |
| WO | WO 2007/119415 A1 | 10/2007 |
| WO | WO 2008/044830 A1 | 4/2008 |
| WO | WO 2008/137864 A2 | 11/2008 |

OTHER PUBLICATIONS

Nortel, "Performance Evaluation of Multi-Antenna SC-FDMA in LTE-A," 3GPP TSG-RAN WG1#55, Prague, Czech Republic, Nov. 10-14, 2008, pp. 1-3, R1-084471.

Alcatel, "ST/SF Coding and Mapping Schemes of the SC-FDMA in E-UTRA Uplink", 3GPP TSG RAN WG1 Meeting #47, R1-063178, Nov. 6-10, 2006, 6 pages.

Ericsson, "Carrier aggregation in LTE-Advance", Discussion and Decision, TSG-RAN WG1 #53bis, Warsaw, Poland, Jun. 30-Jul. 4, 2008, R1-082468.

Huawei, "Physical layer technologies for LTE-Advanced", Discussion/Decision, 3GPP TSG RAN WG1#53, Kansas City, MO., USA, May 5-9, 2008, R1-081838.

Inter Digital Communications, LLC, "ACK/NACK Index Mapping for Uplink Transmission for E-UTRA", Discussion/Decision, 3GPP TSG RAN WG1 Meeting #51, Jeju, Korea, Nov. 5-9, 2007, R1-074701.

International Search Report for PCT/KR2009/004469, mailed on Apr. 13, 2010.

International Search Report for PCT/KR2009/004477, mailed on Feb. 25, 2010.

International Search Report for PCT/KR2009/004479, mailed on Mar. 17, 2010.

International Search Report for PCT/KR2009/004480, mailed on Feb. 25, 2010.

International Search Report for PCT/KR2009/006696, mailed on Jul. 9, 2010.

International Search Report for PCT/KR2009/006723, mailed on Jun. 29, 2010.

(56) References Cited

OTHER PUBLICATIONS

International Search Report for PCT/KR2010/000823, mailed on Sep. 30, 2010.
LG Electronics Inc., "Efficient Utilization of Unused PUCCH RB", Discussion/decision, 3GPP TSG RAN WG1 #52bis, Shenzhen, China, Mar. 31-Apr. 4, 2008, R1-081258.
Mitsubishi Electric, "Uplink transmit diversity schemes for LTE Advanced", 3GPP TSG RAN WG1 #53bis meeting, R1-082522, Jun. 30-Jul. 4, 2008, 5 pages.
Motorola, "UL ACK/NACK for TDD", Discussion/Decisions, 3GPP TSG RAN1#52, Sorrento, Italy, Feb. 11-15, 2008, R1-080738.
Motorola, "Uplink ACK/NACK for TDD", Discussion/Decision, 3GPP TSG RAN1#52-Bis, Shenzhen, China, Mar. 31-Apr. 4, 2008, R1-081292.
NEC Group, "PUCCH allocation for ACK/NACK transmission", Discussion, 3GPP TSG RAN WG1 Meeting #50, Athens, Greece, Aug. 20-24, 2007, R1-073462.
Nokia Siemens Networks, Nokia, "ACK/NACK Bundling Details for LTE TDD", Discussion and Decision, 3GPP TSG RAN WG1 Meeting #53, Kansas City, MO, USA, May 5-9, 2008, R1-081858.
Nokia Siemens Networks, Nokia, "Implicit Mapping of ACK/NACK Resources", Discussion and Decision, 3GPP TSG RAN WG1 Meeting #52, Sorrento, Italy, Feb. 11-15, 2008, R1-080939.
Nokia Siemens Networks, Nokia, "PUCCH Resource Allocation for Repeated ACK/NACK", Discussion and Decision, 3GPP TSG RAN WG1 Meeting #54bis, Prague, Czech Republic, Sep. 29-Oct. 3, 2008, R1-083722.
Nortel, "UL MIMO Enhancement for LTE-A", 3GPP TSG-RAN Working Group 1 Meeting #53bis, R1-082516, Jun. 30-Jul. 5, 2008, 2 pages.
Panasonic et al., "Joint Way forward on the ACK/NACK scrambling for PUCCH", 3GPP TSG RAN WG1 Meeting #54, R1-082731, Jun. 30-Jul. 4, 2008, 3 pages.
Qualcomm Europe, "UL ACK/NACK assignment procedure", Discussion and Decision, 3GPP TSG-RAN WG1 #54, Aug. 18-22, 2008, Jeju, S. Korea, R1-083176.
Qualcomm Europe, "Further details on UL ACK/NAK resource allocation", 3GPP TSG RAN1 #53, R1-081966, May 5-9, 2008, 4 pages.
T. G. Noh et al., "Standardization of 3GPP LTE and LTE-Advanced", Electronics and Communication Trend Analysis, vol. 23, No. 3, Jun. 2008.
Texas Instruments et al., "On Remaining Issues of PUCCH Slot Based CS/OC Remapping", 3GPP TSG RAN WG1 #53b, R1-082660, Jun. 30-Jul. 4, 2008, 3 pages.
Papasakellariou et al., "Sequence Hopping in SC-FDMA Communication Systems", Aug. 30, 2007, 13 pages.
Nokia Siemens Networks et al., "PUCCH Resource Allocation for Repeated ACK/NACK" 3GPP TSG RAN WG1 Meeting #54, Aug. 18-22, 2008, Agenda 6.3, pp. 1-3, R1-083094.

\* cited by examiner

FIG. 7
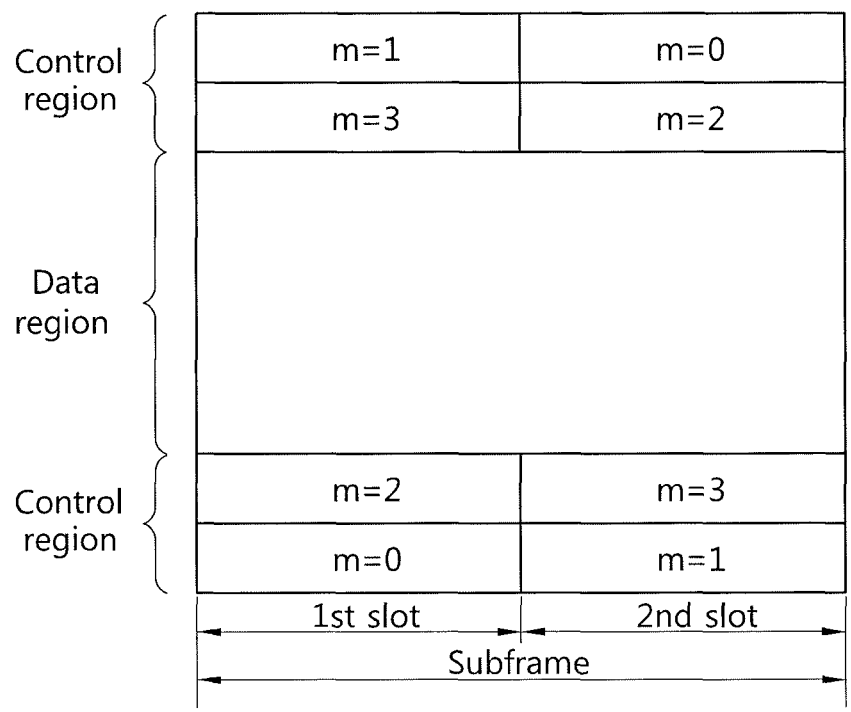
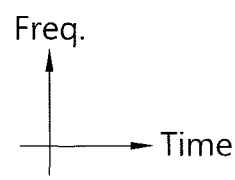

FIG. 22
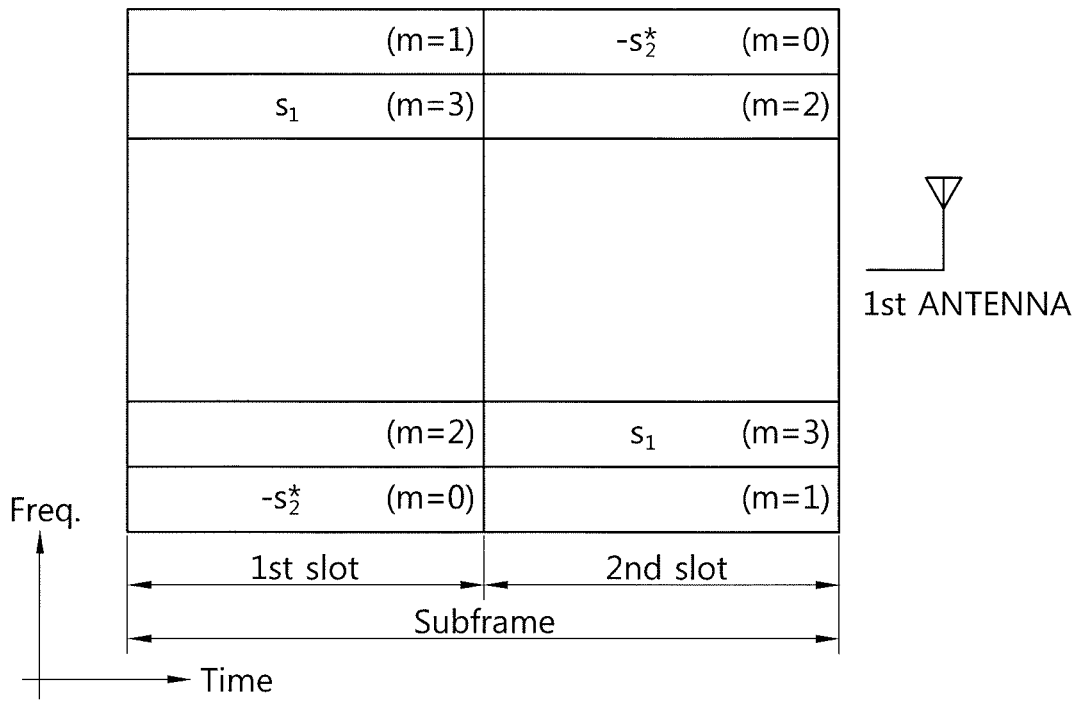
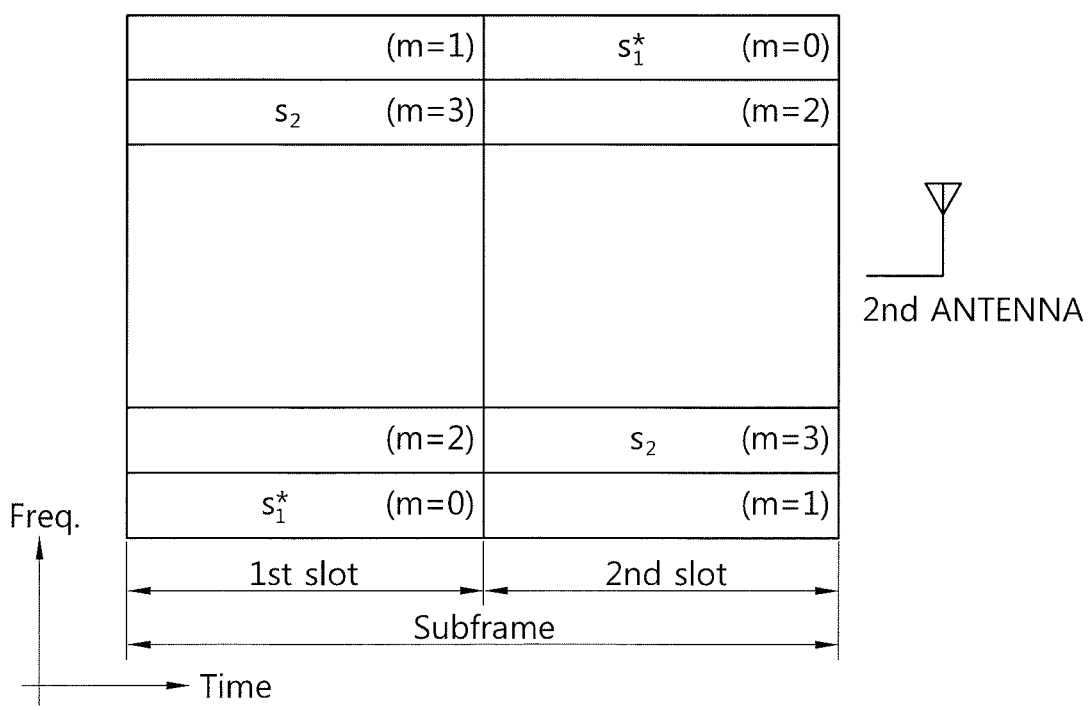

METHOD AND APPARATUS FOR INFORMATION TRANSMISSION IN A RADIO COMMUNICATION SYSTEM

This application is a Continuation of application Ser. No. 13/058,395 filed on Feb. 10, 2011, which is a National Phase of PCT/KR2009/004479 filed on Aug. 11, 2009, which claims the benefit under 35 U.S.C. 119(e) of U.S. Provisional Application Nos. 61/087,737; 61/114,479; 61/115,113; 61/116,298 and 61/117,237 filed on Aug. 11, 2008; Nov. 14, 2008; Nov. 17, 2008; Nov. 20, 2008 and Nov. 24, 2008 respectively, and claims priority under 35 U.S.C. 119 (a) to Patent Application No. 10-2009-0062712 filed in Republic of Korea on Jul. 9, 2009, all of which are hereby expressly incorporated by reference into the present application.

BACKGROUND OF THE INVENTION

1. Field of the Invention

The present invention relates to wireless communications, and more particularly, to a method and apparatus for information transmission in a radio communication system.

2. Related Art

In next generation multimedia radio communication systems, which have been actively studied in recent years, there is a demand for a system capable of processing and transmitting a variety of information (e.g., video and radio data) at a higher data rate in addition to the early-stage voice service. The radio communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment (UE), etc. Various techniques have been developed to overcome the abnormal characteristic of the wireless channel and to increase reliability of radio communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc. A MIMO channel matrix depending on the number of receive antennas and the number of transmit antennas can be decomposed into a plurality of independent channels. Each independent channel is referred to as a spatial layer or a stream. The number of streams is referred to as a rank.

There is an ongoing standardization effort for an international mobile telecommunication-advanced (IMT-A) system aiming at the support of an Internal protocol (IP)-based multimedia seamless service by using a high-speed data transfer rate of 1 gigabits per second (Gbps) in a downlink and 500 megabits per second (Mbps) in an uplink in the international telecommunication union (ITU) as a next generation (i.e., post $3^{rd}$ generation) mobile communication system. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

A typical radio communication system is a single-carrier system supporting one carrier. Since a data transfer rate is in proportion to a transmission bandwidth, the transmission bandwidth needs to increase to support a high-speed data transfer rate. However, except for some areas of the world, it is difficult to allocate frequencies of wide bandwidths. For the effective use of fragmented small bands, a spectrum aggregation (or bandwidth aggregation or a carrier aggregation) technique is being developed. The spectrum aggregation technique is a technique for obtaining the same effect as when a band of a logically wide bandwidth is used by aggregating a plurality of physically non-contiguous bands in a frequency domain. By using the spectrum aggregation technique, multiple carriers can be supported in the radio communication system. The radio communication system supporting the multiple carriers is referred to as a multiple carrier system. The carrier may also be referred to as other terms, such as, a radio frequency (RF), a component carrier, etc.

Meanwhile, a variety of uplink control information is transmitted through an uplink control channel. Examples of the uplink control information include an acknowledgement (ACK)/not-acknowledgement (NACK) used to perform hybrid automatic repeat request (HARQ), a channel quality indicator (CQI) for indicating a downlink channel state, a scheduling request (SR) for requesting radio resource allocation for uplink transmission, etc.

A plurality of user equipments (UEs) in a cell can transmit uplink information simultaneously to a base station (BS). The BS needs to be able to identify each UE's uplink information simultaneously transmitted. When the uplink information of each UE is transmitted by using a different frequency, the BS can identify the information. Frequency division multiplexing (FDM) is a multiplexing scheme in which a plurality of UEs are multiplexed by using different frequencies. However, the plurality of UEs in the cell may transmit the uplink information to the BS by using the same time-frequency resource. In order to identify each UE's uplink information transmitted using the same time-frequency resource, an orthogonal sequence may be used by each UE in uplink information transmission. Alternatively, a sequence having a low correlation may be used. As such, a multiplexing scheme in which the plurality of UEs are multiplexed by using different sequences is referred to as code division multiplexing (CDM). That is, uplink information of the plurality of UEs can be transmitted by being multiplexed using the CDM and/or the FDM. However, when the CDM-based information transmission method is combined with a multiple-input multiple-output (MIMO) technique, there may be a problem in that orthogonality is not maintained. When the orthogonality is not maintained, it becomes more difficult for the BS to identify information of each UE than a case where the orthogonality is maintained. As a result, reliability of radio communication may deteriorate, and overall system capability may become worse.

Accordingly, there is a need for a method and apparatus for effective information transmission by combining the MIMO scheme with the CDM and/or the FDM.

SUMMARY OF THE INVENTION

The present invention provides a method and apparatus for information transmission in a radio communication system.

In an aspect, an information transmission method performed by a transmitter in a radio communication system is provided. The information transmission method include generating first and second symbols corresponding to information, generating first and second transmit vectors on the basis of an Alamouti code from the first and second symbols, and transmitting the first transmit vector through a first antenna and transmitting the second transmit vector through a second antenna, wherein the first transmit vector consists of a first transmit symbol and a second transmit symbol, the first transmit symbol is transmitted based on a first resource index, and the second transmit symbol is transmitted based on a second resource index, and wherein the second transmit vector consists of a third transmit symbol and a fourth transmit symbol, the third transmit symbol is transmitted based on the first resource index, and the fourth transmit symbol is transmitted based on the second resource index.

Preferably, the first transmit symbol may be generated based on the first symbol, the second transmit symbol may be generated based on the second symbol, the third transmit symbol may be obtained by appending a negative sign to a complex conjugate of the second transmit symbol, and the fourth transmit symbol may be a complex conjugate of the first transmit symbol.

Preferably, the resource index may include a sequence index indicating a sequence, and the sequence allows a transmit symbol to be spread to a frequency domain or a time domain, and the first resource index and the second resource index may include different sequence indices.

Preferably, the sequence index may indicate a cyclic shift amount, and the sequence may be generated by cyclically shifting a base sequence by the cyclic shift amount.

Preferably, the sequence index may be one sequence index selected from a set of sequence indices, and sequences indicated by the sequence indices may be orthogonal to each other.

Preferably, a resource index may include resource block information indicating a resource block on which a transmit symbol is transmitted and a sequence index indicating a sequence, and the sequence may allow the transmit symbol to be spread to a frequency domain and a time domain, and the first resource index and the second resource index may include different resource block information or different sequence indices.

Preferably, a resource index may include a frequency-domain sequence index indicating a frequency-domain sequence and a time-domain sequence index indicating a time-domain sequence, the frequency-domain sequence and the time-domain sequence may allow the transmit symbol to be spread to a 2 dimensional domain of a time-frequency domain, and the first resource index and the second resource index may include different frequency-domain sequence indices or different time-domain sequence indices.

Preferably, a resource index may include resource block information indicating a resource block on which a transmit symbol is transmitted, a frequency-domain sequence index indicating a frequency-domain sequence, and a time-domain sequence index indicating a time-domain sequence, the frequency-domain sequence and the time-domain sequence may allow the transmit symbol to be spread to a 2 dimensional domain of a time-frequency domain, and at least one of the resource block information, the frequency-domain sequence index, and the time-domain sequence index included in each of the first resource index and the second resource index may be different.

The information transmission method may further include obtaining the first resource index and the second resource index.

Preferably, the first symbol may be a first modulation symbol for first information, and the second symbol may be a second modulation symbol for second information.

Preferably, the first information and the second information may be different control information.

In another aspect, an apparatus for radio communication including a modulator for generating a first symbol and a second symbol by modulating an information bit stream, a space block coding (SBC) processor for generating a first transmit vector consisting of a first transmit symbol and a second transmit symbol and a second transmit symbol consisting of a third transmit symbol and a fourth transmit symbol on the basis of an Alamouti code from the first and second symbols, a first antenna for transmitting the first transmit vector, and a second antenna for transmitting the second transmit vector, wherein the first transmit symbol is transmitted based on a first resource index, and the second transmit symbol is transmitted based on a second resource index, and wherein the third transmit symbol is transmitted based on the first resource index, and the fourth transmit symbol is transmitted based on the second resource index is provided.

According to the present invention, a method and apparatus for effective information transmission in a radio communication system are provided. Therefore, overall system performance can be improved.

BRIEF DESCRIPTION OF THE DRAWINGS

FIG. 7 shows an example of a UL subframe structure in 3GPP LTE.

FIG. 22 shows an example of an information transmission method when a 1st RB and a 2nd RB are different from each other.

DESCRIPTION OF EXEMPLARY EMBODIMENTS

Techniques described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The SC-FDMA is a scheme in which inverse fast Fourier transform (IFFT) is performed on complex-valued symbols subjected to discrete Fourier transform (DFT) spreading, and is also referred to as DFT spreading-orthogonal frequency division multiplexing (DFTS-OFDM). In addition, the techniques described below can also be used in a multiple access scheme modified from the SC-FDMA, for example, clustered SC-FDMA, N×SC-FDMA, etc. The clustered SC-FDMA is a scheme in which complex-valued symbols subjected to DFT spreading are divided into a plurality of sub-blocks and the plurality of sub-blocks are distributed in a frequency domain and are mapped to subcarriers. The clustered SC-FDMA is also referred to as clustered DFTS-OFDM. The N×SC-FDMA is a scheme in which a code block is divided into a plurality of chunks and DFT and IFFT are performed on a chunk basis. The N×SC-FDMA is also referred to as chunk specific DFTS-OFDM.

The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the 3GPP LTE/LTE-A. However, technical features of the present invention are not limited thereto.

Figure 1:
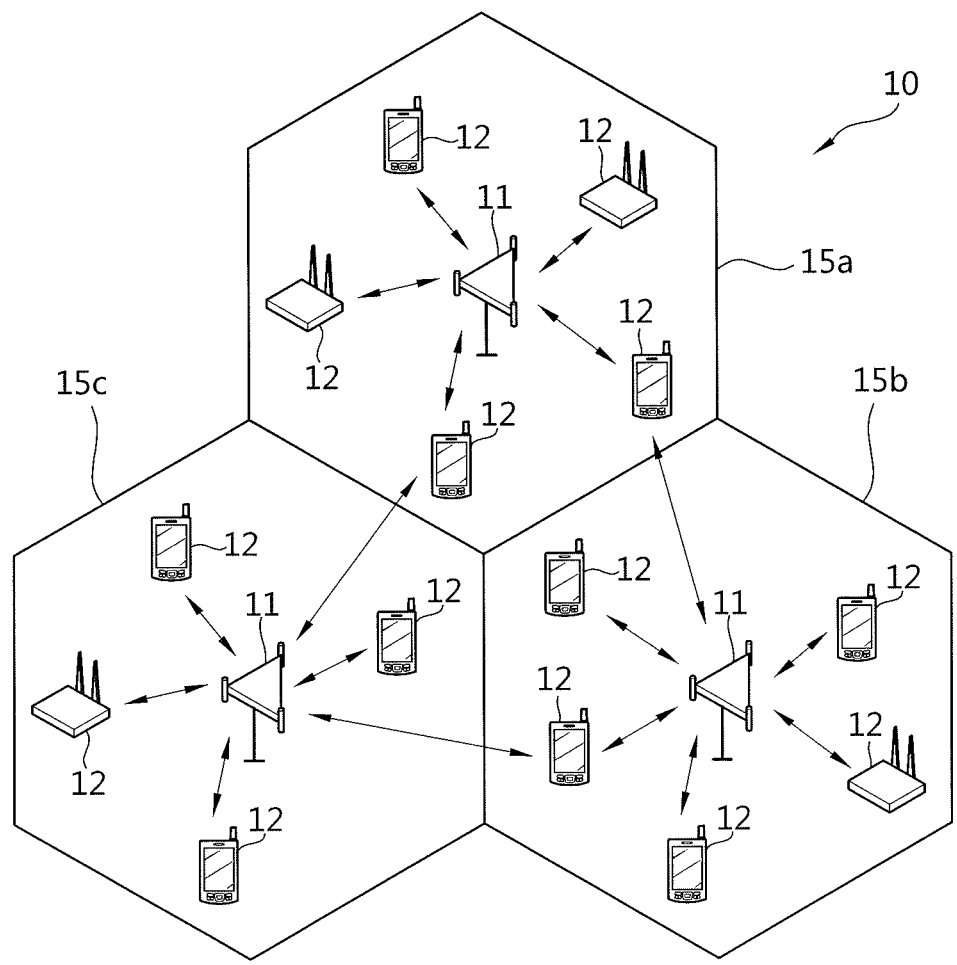
FIG. 1 shows a radio communication system.

FIG. 1 shows a radio communication system.

Referring to FIG. 1, a radio communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

A heterogeneous network implies a network in which a relay station, a femto cell and/or a pico cell, and the like are deployed. In the heterogeneous network, the DL may imply communication from the BS to the relay station, the femto cell, or the pico cell. Further, the DL may also imply communication from the relay station to the UE. Furthermore, in case of multi-hop relay, the DL may imply communication from a first relay station to a second relay station. In the heterogeneous network, the UL may imply communication from the relay station, the femto cell, or the pico cell to the BS. Further, the UL may also imply communication from the UE to the relay station. Furthermore, in case of multi-hop relay, the UL may imply communication from the second relay station to the first relay station.

The radio communication system may be any one of a multiple input multiple output (MIMO) system, a multiple input single output (MISO) system, a single input single output (SISO) system, and a single input multiple output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

Hereinafter, the transmit antenna denotes a physical or logical antenna used for transmission of one signal or stream. The receive antenna denotes a physical or logical antenna used for reception of one signal or stream.

UL and/or DL hybrid automatic repeat request (HARQ) can be supported in the radio communication system. In addition, a channel quality indicator (CQI) can be used for link adaptation.

Figure 2:
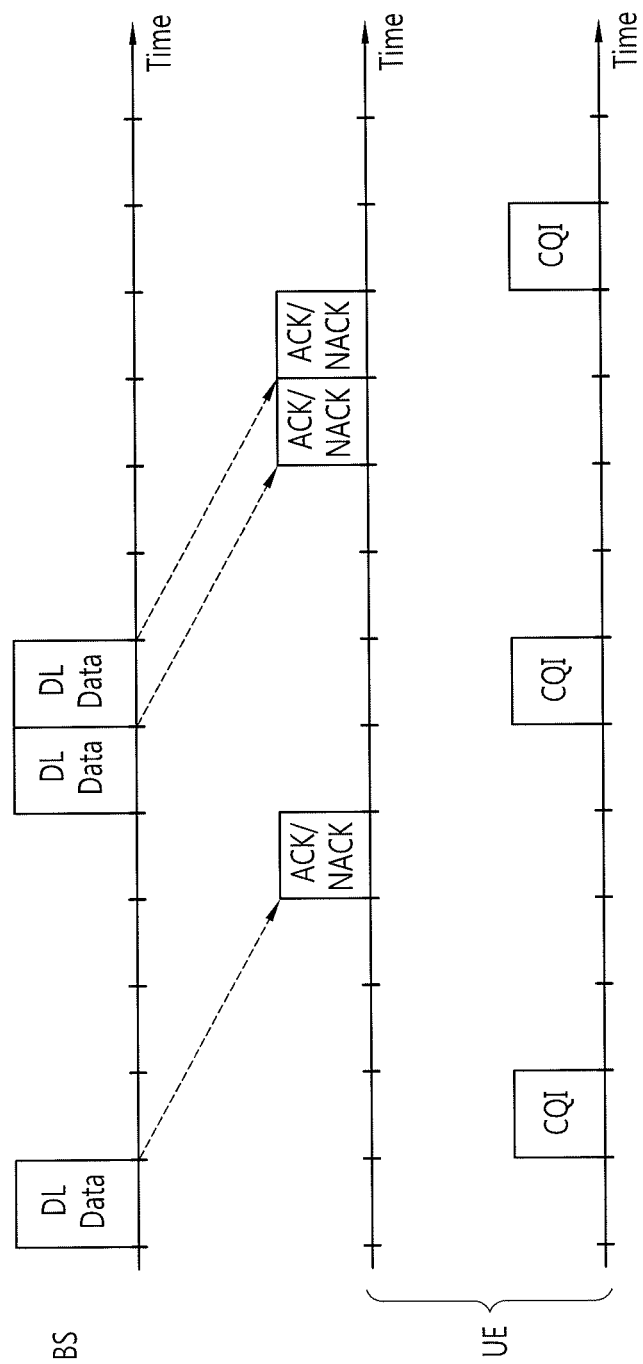
FIG. 2 shows HARQ acknowledgement (ACK)/non-acknowledgement (NACK) and CQI transmission.

FIG. 2 shows HARQ acknowledgement (ACK)/not-acknowledgement (NACK) and CQI transmission.

Referring to FIG. 2, upon receiving DL data from a BS, a UE transmits an HARQ ACK/NACK after a specific time elapses. The DL data may be transmitted on a physical downlink shared channel (PDSCH) indicated by a physical downlink control channel (PDCCH). The HARQ ACK/NACK corresponds to an ACK when the DL data is successfully decoded, and corresponds to an NACK when the DL data fails in decoding. Upon receiving the NACK, the BS can transmit the DL data until the ACK is received or until retransmission is performed up to a maximum number of retransmission attempts.

A transmission time of the HARQ ACK/NACK for the DL data or resource allocation information for HARQ ACK/NACK transmission may be dynamically reported by the BS by using signaling. Alternatively, the transmission time of the HARQ ACK/NACK, the resource allocation information, etc., may be pre-agreed according to the transmission time of the DL data or resource used for transmission of the DL data. For example, when a PDSCH is received on an $n^{th}$ subframe in a frequency division duplex (FDD) system, an HARQ ACK/NACK for the PDSCH may be transmitted on a physical uplink control channel (PUCCH) in an $(n+4)^{th}$ subframe.

The UE may measure a DL channel state and report a CQI to the BS periodically and/or non-periodically. The BS may use the CQI in DL scheduling. The BS may use the CQI received from the UE to determine a modulation and coding scheme (MCS) used in transmission. If it is determined that the channel state is good by using the CQI, the BS may perform transmission by increasing a modulation order or by increasing a coding rate. If it is determined that the channel state is not good by using the CQI, the BS may decrease a data rate by decreasing the modulation order or by decreasing the coding rate. A reception error rate may decrease when the data rate decreases. The CQI may indicate a channel state for a full band and/or a channel state for some parts of the full band. The BS may report information on a transmission time of the CQI or resource allocation information for CQI transmission to the UE.

In addition to the CQI, the UE may report a precoding matrix indicator (PMI), a rank indicator (RI), etc., to the BS. The PMI indicates an index of a precoding matrix selected from a codebook. The RI indicates the number of useful transmission layers. Hereinafter, the CQI is the concept of including not only the CQI but also the PMI and the RI.

Figure 3:
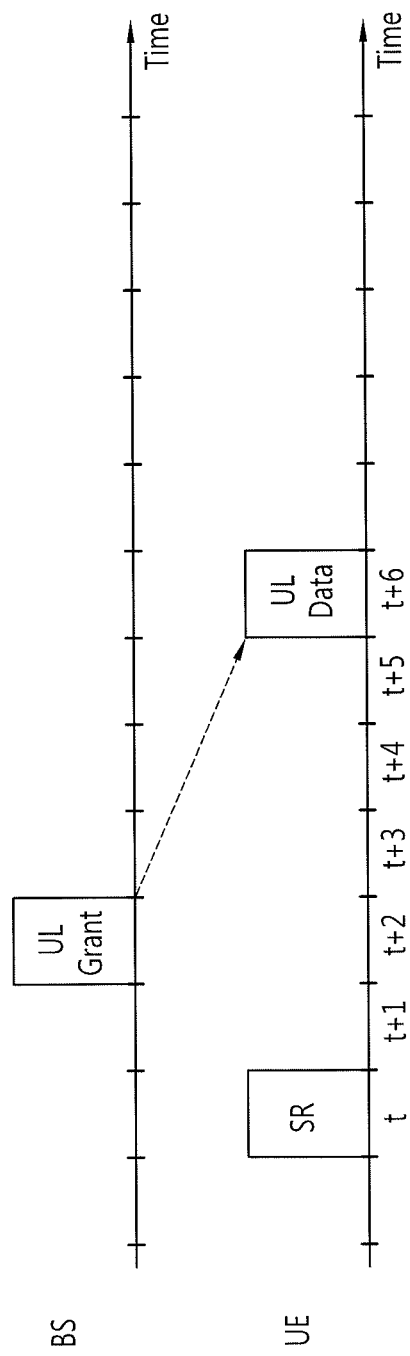
FIG. 3 shows UL transmission.

FIG. 3 shows UL transmission.

Referring to FIG. 3, for UL transmission, a UE first transmits a scheduling request (SR) to a BS. The SR is used when the UE requests the BS to allocate UL radio resources. The SR can also be referred to as a bandwidth request. The SR is a sort of preliminary information exchange for data exchange. In order for the UE to transmit UL data to the BS, the UE firsts requests allocation of the radio resources by using the SR. The BS may report to the UE a transmission time of the SR or resource allocation information for SR transmission. The SR may be periodically transmitted. The BS may report to the UE a transmission period of the SR.

In response to the SR, the BS sends a UL grant to the UE. The UL grant may be transmitted on a PDCCH. The UL grant includes information on UL radio resource allocation. The UE transmits UL data by using the allocated UL radio resource.

As shown in FIG. 2 and FIG. 3, the UE can transmit UL control information (e.g., an HARQ ACK/NACK, a CQI, and an SR) in a given transmission time. A type and size of the UL control information may vary depending on a system, and technical features of the present invention are not limited thereto.

Figure 4:
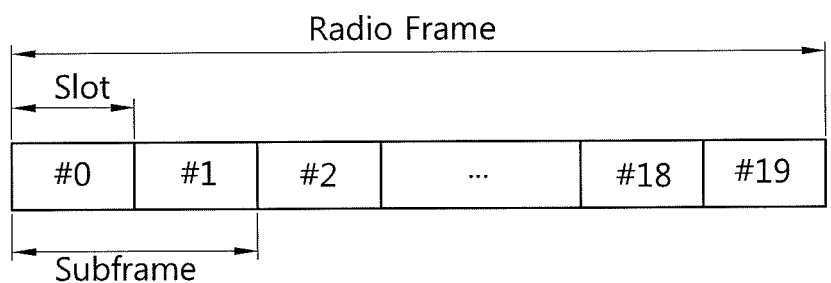
FIG. 4 shows a structure of a radio frame in $3^{rd}$ generation partnership project (3GPP) long term evolution (LTE).

FIG. 4 shows a structure of a radio frame in 3GPP LTE.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 4 is shown for exemplary purposes only. Thus, the number of subframes included in the radio frame or the number of slots included in the subframe may change variously.

Figure 5:
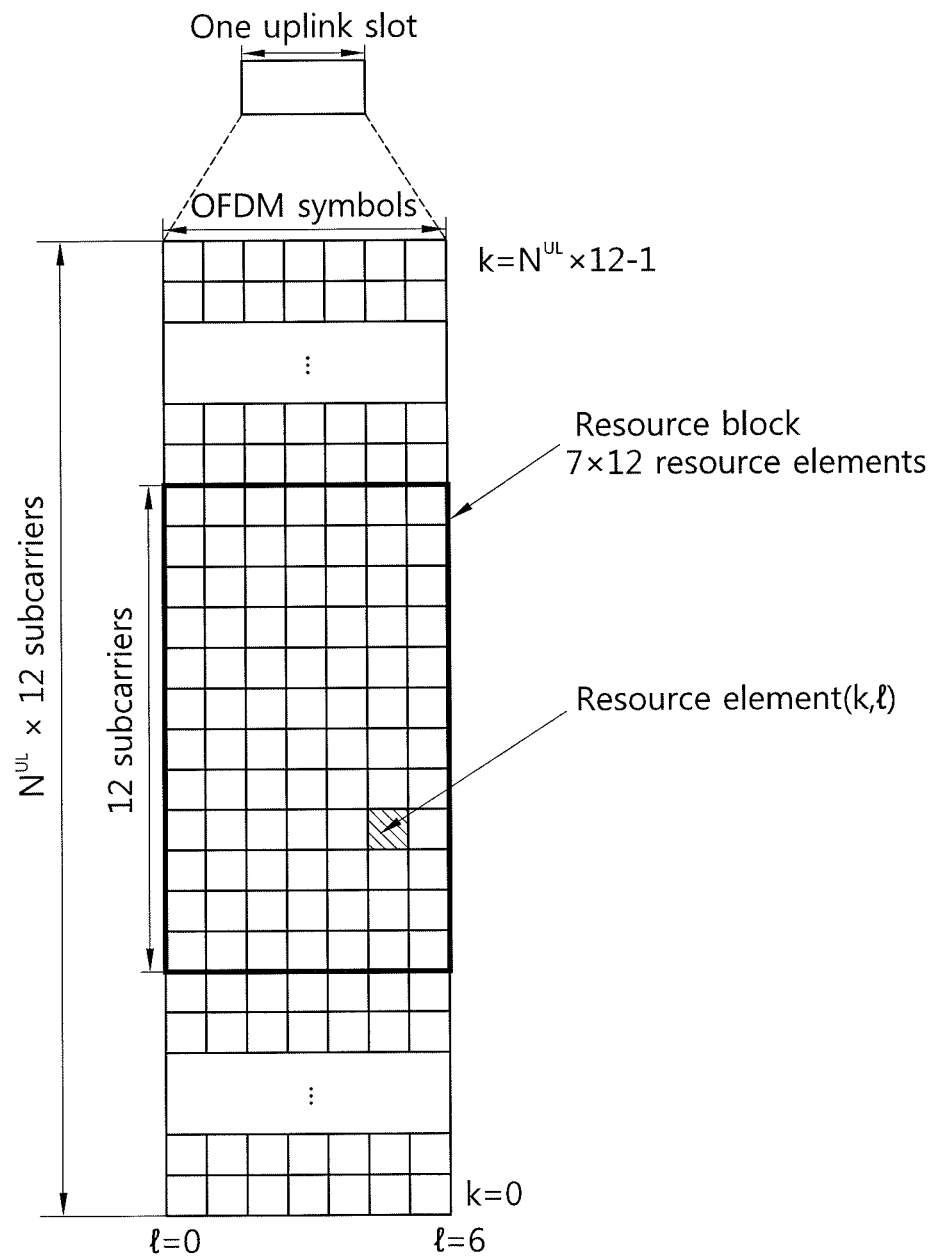
FIG. 5 shows an example of a resource grid for one UL slot in 3GPP LTE.

FIG. 5 shows an example of a resource grid for one UL slot in 3GPP LTE.

Referring to FIG. 5, the UL slot includes a plurality of OFDM symbols in a time domain, and includes $N^{UL}$ resource blocks (RBs) in a frequency domain. The OFDM symbol represents one symbol period. The OFDM symbol can apply to a multiple access scheme such as OFDMA, SC-FDMA, clustered SC-FDMA, NxSC-FDMA, or the like. The OFDM symbol can also be referred to as an SC-FDMA symbol, an OFDMA symbol, or a symbol period according to a system.

The RB includes a plurality of subcarriers in the frequency domain. The number $N^{UL}$ of RBs included in the UL slot depends on a UL transmission bandwidth defined in a cell.

Each element on the resource grid is referred to as a resource element. The resource element on the resource grid can be identified by an index pair (k, l) within the slot. Herein, $k(k=0, \ldots, N^{UL} \times 12-1)$ denotes a subcarrier index in the frequency domain, and $l(l=0, \ldots, 6)$ denotes a symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of subcarriers or the number of OFDM symbols included in the RB may change variously. Hereinafter, the RB implies a typical frequency resource. That is, if the RB differs, the frequency resource also differs. The number of OFDM symbols may change depending on a cyclic prefix (CP) length. For example, when using a normal CP, the number of OFDM symbols is 7, and when using an extended CP, the number of OFDM symbols is 6.

The resource grid for one UL slot in the 3GPP LTE of FIG. 5 can directly apply to a resource grid for a DL slot.

Figure 6:
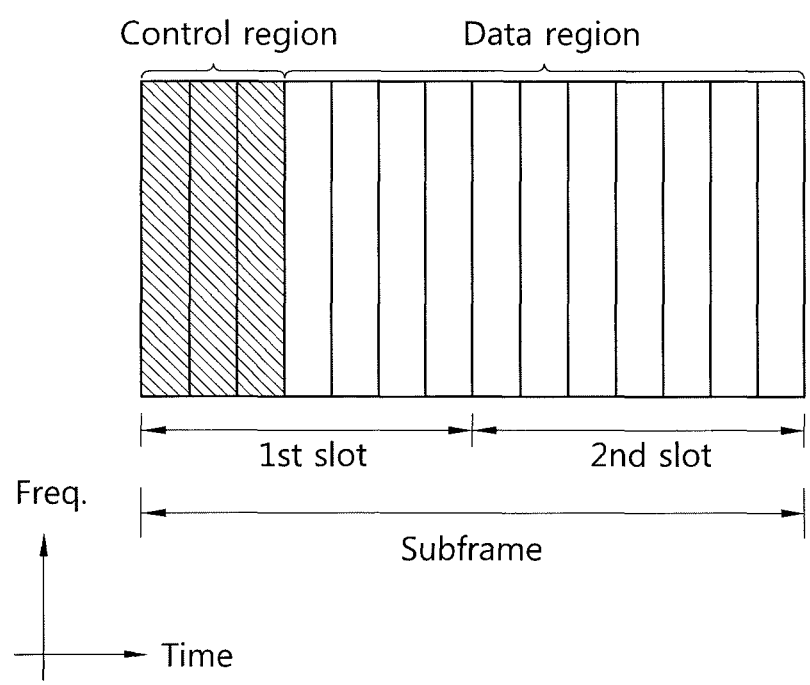
FIG. 6 shows an example of a DL subframe structure in 3GPP LTE.

FIG. 6 shows an example of a DL subframe structure in 3GPP LTE.

Referring to FIG. 6, a DL subframe includes two consecutive slots. Up to three preceding OFDM symbols of a first slot in the DL subframe correspond to a control region. The remaining OFDM symbols correspond to a data region.

A PDSCH may be allocated to the data region. DL data is transmitted on the PDSCH. The DL data may be a transport block, i.e., a data block for a downlink shared channel (DL-SCH) which is a transport channel transmitted during a TTI. A BS may transmit to a UE the DL data through a single antenna or multiple antennas. In the 3GPP LTE, the BS may transmit to the UE one codeword through the single antenna or the multiple antennas, or may transmit two codewords through the multiple antennas. That is, up to two codewords are supported in the 3GPP LTE. The codewords are coded bits obtained by performing channel coding on an information bit corresponding to information. Modulation may be performed on each codeword.

Examples of a control channel that can be allocated to the control region include a physical control format indicator channel (PCFICH), a physical HARQ indicator channel (PHICH), a PDCCH, etc.

The PCFICH carries information indicating the number of OFDM symbols used for transmission of PDCCHs in a subframe. Herein, the control region includes 3 OFDM symbols for exemplary purposes only. The PHICH carries an HARQ ACK/NACK for UL transmission.

The control region consists of a set of a plurality of control channel elements (CCEs). If a total number of CCEs constituting a CCE set is N(CCE) in the DL subframe, the CCEs are indexed from 0 to N(CCE)-1. The CCEs correspond to a plurality of resource elements groups. The resource element group is used to define mapping of the control channel to resource elements. One resource element group consists of a plurality of resource elements. A PDCCH is transmitted on an aggregation of one or several contiguous CCEs. A plurality of PDCCHs may be transmitted in the control region.

The PDCCH carries DL control information such as DL scheduling information, UL scheduling information, or UL power control commands. When the BS transmits DL data on the PDSCH in a subframe to the UE, the BS carries DL control information used for scheduling of the PDSCH on the PDCCH in the subframe. The UE may read the DL data transmitted on the PDSCH by decoding the DL control information.

FIG. 7 shows an example of a UL subframe structure in 3GPP LTE.

Referring to FIG. 7, a UL subframe can be divided into a control region to which a PUCCH for carrying UL control information is allocated and a data region to which a physical uplink shared channel (PUSCH) for carrying UL data is allocated. In 3GPP LTE (Release 8), RBs allocated to one UE are contiguous in a frequency domain in order to maintain a single-carrier property. One UE cannot concurrently transmit the PUCCH and the PUSCH. Concurrent transmission of the PUCCH and the PUSCH are taken into account in LTE-A (Release 10).

The PUCCH for one UE is allocated in an RB pair. RBs belonging to the RB pair occupy different subcarriers in each of a first slot and a second slot. A frequency occupied by the RBs belonging to the RB pair allocated to the PUCCH changes at a slot boundary. That is, the RBs allocated to the PUCCH are hopped in a slot level. Hereinafter, hopping of RBs in the slot level is referred to as frequency hopping. Since the UE transmits UL control information over time at a frequency located in a different position, a frequency diversity gain can be obtained. In FIG. 7, m is a location index indicating a logical frequency-domain location of the RB pair allocated to the PUCCH in the subframe.

The PUSCH is mapped to an uplink shared channel (UL-SCH) that is a transport channel. Examples of the UL control information transmitted on the PUCCH include an HARQ ACK/NACK, a CQI indicating a DL channel state, an SR that is a UL radio resource allocation request, etc.

The PUCCH can support multiple formats. That is, UL control information having a different number of bits per subframe can be transmitted according to a modulation scheme depending on an application of the PUCCH format. Table 1 below shows an example of the modulation scheme depending on the PUCCH format and the number of bits per subframe.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to transmit the SR. The PUCCH formats 1a/1b are used to transmit the HARQ ACK/NACK. The PUCCH format 2 is used to transmit the CQI. The PUCCH formats 2a/2b are used to transmit the CQI and the HARQ ACK/NACK.

In any subframe, if the HARQ ACK/NACK is transmitted alone, the PUCCH formats 1a/1b are used, and if the SR is transmitted alone, the PUCCH format 1 is used. The UE can concurrently transmit the HARQ ACK/NACK and the SR. For positive SR transmission, the UE transmits the HARQ ACK/NACK by using a PUCCH resource allocated for the SR. For negative SR transmission, the UE transmits the HARQ ACK/NACK by using a PUCCH resource allocated for the ACK/NACK.

Control information transmitted on the PUCCH uses a cyclically shifted sequence. The cyclically shifted sequence may be generated by cyclically shifting a base sequence by a specific cyclic shift (CS) amount. The specific CS amount is indicated by a CS index. Various types of sequences may be used as the base sequence. For example, well-known sequences (e.g., a pseudo-random (PN) sequence and a Zadoff-Chu (ZC) sequence) may be used as the base sequence. In addition, a computer generated constant amplitude zero auto-correlation (CAZAC) sequence may be used as the base sequence. Equation 1 below shows an example of the base sequence.

$$r_i(n) = e^{jb(n)\pi/4} \quad \text{[Equation 1]}$$

In Equation 1, $i \in \{0, 1, \ldots, 29\}$ denotes a root index, and n denotes an element index satisfying $0 \leq n \leq N-1$, where N is a length of the base sequence. i denotes a cell identifier (ID), and may be determined by a slot number or the like within a radio frame. If one RB includes 12 subcarriers, N may be set to 12. A different root index defines a different base sequence. If N=12, b(n) can be defined by Table 2 below.

TABLE 2

| i | b(0), ..., b(11) | | | | | | | | | | | |
| --- | --- | --- | --- | --- | --- | --- | --- | --- | --- | --- | --- | --- |
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | 1 | 1 | 3 | −1 | 1 | 3 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A cyclically shifted sequence r(n, Ics) may be generated by cyclically shifting a base sequence r(n) according to Equation 2 below.

$$r(n, I_{CS}) = r(n) \cdot \exp\left(\frac{j2\pi I_{CS} n}{N}\right), 0 \leq I_{CS} \leq N - 1 \quad \text{[Equation 2]}$$

In Equation 2, Ics denotes a CS index indicating a CS amount ($0 \leq Ics \leq N-1$, where Ics is an integer).

Hereinafter, an available CS index of the base sequence is defined as a CS index that may be derived from the base sequence according to a CS interval. For one example, if the base sequence has a length of 12 and the CS interval is 1, a total number of available CS indices is 12. For another example, if the base sequence has a length of 12 and the CS interval is 2, a total number of available CS indices is 6. The CS interval may be determined by considering a delay spread.

Figure 8:
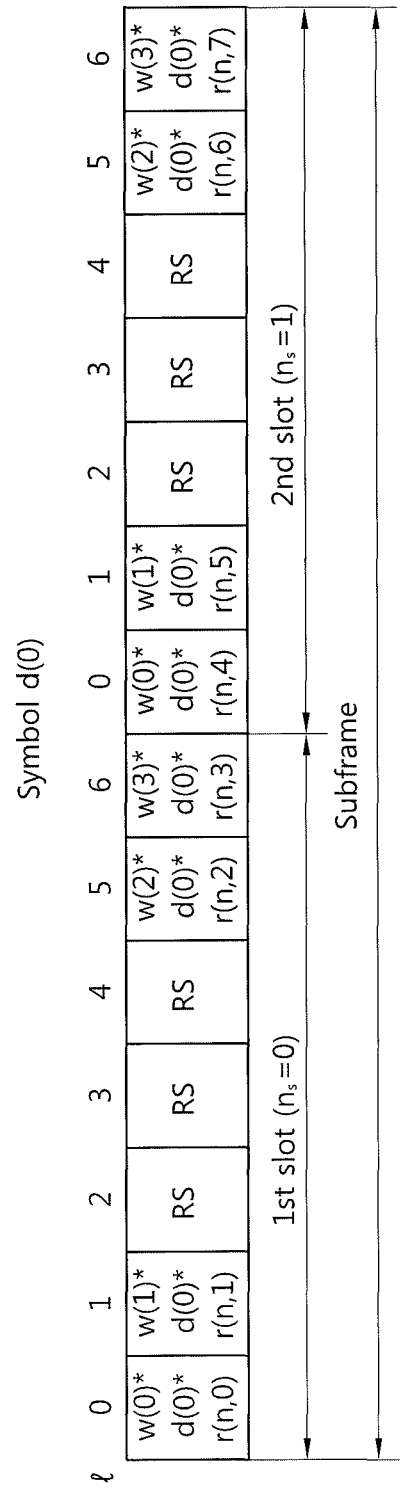
FIG. 8 shows an example of PUCCH format 1/1a/1b transmission when a normal CP is used.

FIG. 8 shows an example of PUCCH format 1/1a/1b transmission when a normal CP is used. Herein, an RB pair allocated to a first slot and a second slot in one subframe is shown. Although it is shown herein that RBs belonging to the RB pair occupy the same frequency band in the first slot and the second slot, the RBs can be hopped in a slot level as described in FIG. 7.

Referring to FIG. 8, each of the first slot and the second slot includes 7 OFDM symbols. Among the 7 OFDM symbols of each slot, a reference signal (RS) is carried on 3 OFDM symbols, and control information is carried on the remaining 4 OFDM symbols. The RS is carried on 3 contiguous OFDM symbols positioned in a middle portion of each slot. In this case, the position and the number of symbols used for the RS may vary, and thus the position and the number of symbols used for the control information may also vary.

Each of the PUCCH formats 1, 1a, and 1b uses one complex-valued symbol d(0). A BS can detect an SR according to presence/absence of PUCCH format 1 transmission from a UE. That is, on-off keying (OOK) modulation scheme may be used in SR transmission. Therefore, any complex number can be used as the complex-valued symbol d(0) for the PUCCH format 1. For example, d(0)=1 can be used. The complex-valued symbol d(0) for the PUCCH format 1a is a modulation symbol generated when 1-bit HARQ ACK/NACK information is modulated using binary phase shift keying (BPSK). The complex-valued symbol d(0) for the PUCCH format 1b is a modulation symbol generated when 2-bit HARQ ACK/NACK information is modulated using quadrature phase shift keying (QPSK). The PUCCH format 1a is for HARQ ACK/NACK information on one codeword. The PUCCH format 1b is for HARQ ACK/NACK information on two codewords.

Table 3 below shows an example of a modulation symbol to which an HARQ ACK/NACK information bit is mapped according to a modulation scheme.

TABLE 3

| Modulation scheme | Information bit(s) | d(0) |
|---|---|---|
| BPSK | 0 | 1 |
|  | 1 | −1 |
| QPSK | 00 | 1 |
|  | 01 | −j |
|  | 10 | j |
|  | 11 | −1 |

A modulated sequence s(n) is generated by using the complex-valued symbol d(0) for the PUCCH formats 1/1a/1b and the cyclically shifted sequence r(n,Ics). The modulated sequence s(n) may be generated by multiplying the complex-valued symbol d(0) by the cyclically shifted sequence r(n,Ics) according to Equation 3 below.

$$s(n)=d(0)r(n,I_{cs})$$ [Equation 3]

A CS index Ics of the cyclically shifted sequence r(n,Ics) may be hopped in a symbol level, starting from an allocated resource. Hereinafter, hopping of the CS index in the symbol level is referred to as CS hopping. The CS hopping can be performed according to a slot number $n_s$ within a radio frame and a symbol index l within a slot. Therefore, the CS index Ics can be expressed by Ics($n_s$,l). The CS hopping can be performed in a cell-specific manner in order to randomize inter-cell interference. Herein, a slot number of the first slot is set to 0, a slot number of the second slot is set to 1, and the CS index is set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE multiplexing capacity, the modulated sequence s(n) may be spread by using an orthogonal sequence. The UE multiplexing capacity denotes the number of UEs that can be multiplexed to the same RB.

Herein, it is shown that the modulated sequence s(n) is spread by using an orthogonal sequence w(k) having a spreading factor K=4 with respect to 4 OFDM symbols for carrying control information within one slot. An orthogonal sequence $w_{Ios}(k)$ having a spreading factor K=4 (where Ios is an orthogonal sequence (OS) index, k is an element index of an orthogonal sequence, 0≤k≤K−1) may use a sequence as shown in Table 4 below.

TABLE 4

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Elements constituting the orthogonal sequence sequentially correspond in a one-to-one manner to OFDM symbols for carrying control information. Each element of the orthogonal sequence is multiplied by the modulated sequence s(n) carried on its corresponding OFDM symbol to generate a spread sequence. The spread sequence is mapped to an RB pair allocated to a PUCCH in a subframe. After the spread sequence is mapped to the RB pair, IFFT is performed on each OFDM symbol of the subframe to output a time-domain signal for the control information. Although the orthogonal sequence is multiplied before the IFFT is performed, the same result can also be obtained when the orthogonal sequence is multiplied after performing the IFFT on the modulated sequence s(n).

Alternatively, the orthogonal sequence $w_{Ios}(k)$ having a spreading factor K=3 (where Ios is an OS index, k is an element index of an orthogonal sequence, 0≤k≤K−1) may use a sequence as shown in Table 5 below.

TABLE 5

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When a sounding reference signal (SRS) and the PUCCH formats 1/1a/1b are concurrently transmitted in one subframe, one OFDM symbol on the PUCCH is punctured. For example, a last OFDM symbol of the subframe may be punctured. In this case, in a first slot of the subframe, the control information is carried on 4 OFDM symbols. In a second slot of the subframe, the control information is carried on 3 OFDM symbols. Therefore, the orthogonal sequence having the spreading factor K=4 is used for the first slot, and the orthogonal sequence having the spreading factor K=3 is used for the second slot.

The OS index may be hopped in a slot level, starting from an allocated resource. Hereinafter, hopping of the OS index in the slot level is referred to as OS remapping. The OS remapping can be performed according to the slot number $n_s$ within the radio frame. Therefore, the OS index Ios can be expressed by Ios($n_s$). The OS remapping may be performed to randomize inter-cell interference.

The modulated sequence s(n) may be subjected to scrambling in addition to spreading using the orthogonal sequence.

For example, the modulated sequence s(n) may be multiplied by 1 or j according to a specific parameter.

The RS can be generated based on the orthogonal sequence and the cyclically shifted sequence generated from the same base sequence as the control information. The cyclically shifted sequence may be used as the RS by spreading the cyclically shifted sequence by the use of the orthogonal sequence w(k) having a spreading factor K=3. Therefore, in order for the UE to transmit the control information, in addition to the OS index and the CS index for the control information, the OS index and the CS index for the RS are also required.

Figure 9:
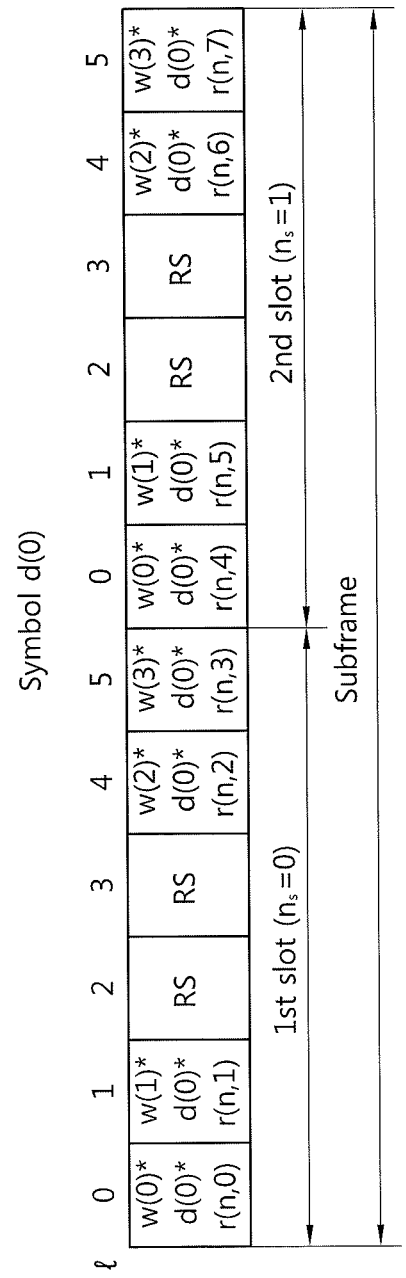
FIG. 9 shows an example of PUCCH format 1/1a/1b transmission when an extended CP is used.

FIG. 9 shows an example of PUCCH format 1/1a/1b transmission when an extended CP is used. Although it is shown herein that RBs belonging to an RB pair occupy the same frequency band in a first slot and a second slot, the RBs may be hopped in a slot level as described in FIG. 7.

Referring to FIG. 9, each of the first slot and the second slot includes 6 OFDM symbols. Among the 6 OFDM symbols of each slot, an RS is carried on 2 OFDM symbols, and control information is carried on the remaining 4 OFDM symbols. Other than that, the example of FIG. 8 in which the normal CP is used can be applied without alteration. However, the RS can be used by spreading the cyclically shifted sequence by the use of an orthogonal sequence w(k) having a spreading factor K=2.

An orthogonal sequence $w_{Ios}(k)$ having a spreading factor K=2 (where Ios is an OS index, k is an element index of an orthogonal sequence, $0 \leq k \leq K-1$) may use a sequence as shown in Table 6 below.

As described above, in both cases of the normal CP and the extended CP, the following information is necessary for PUCCH format 1/1a/1b transmission. That is, a subcarrier (or RB) for transmitting the control information, a CS index Ics and an OS index Ios for the control information, and a CS index I'cs and an OS index I'os for the RS are necessary. For example, when a CS interval is 2 in the extended CP, the UE multiplexing capacity is as follows. Since the number of CS indices Ics and the number of OS indices Ios for the control information are respectively 6 and 3, 18 UEs can be multiplexed per one RB. However, the number of CS indices I'cs and the number of OS indices I'os for the RS are respective 6 and 2, 12 UEs can be multiplexed per one RB. Therefore, the UE multiplexing capacity is limited by an RS part rather than a control information part.

Figure 10:
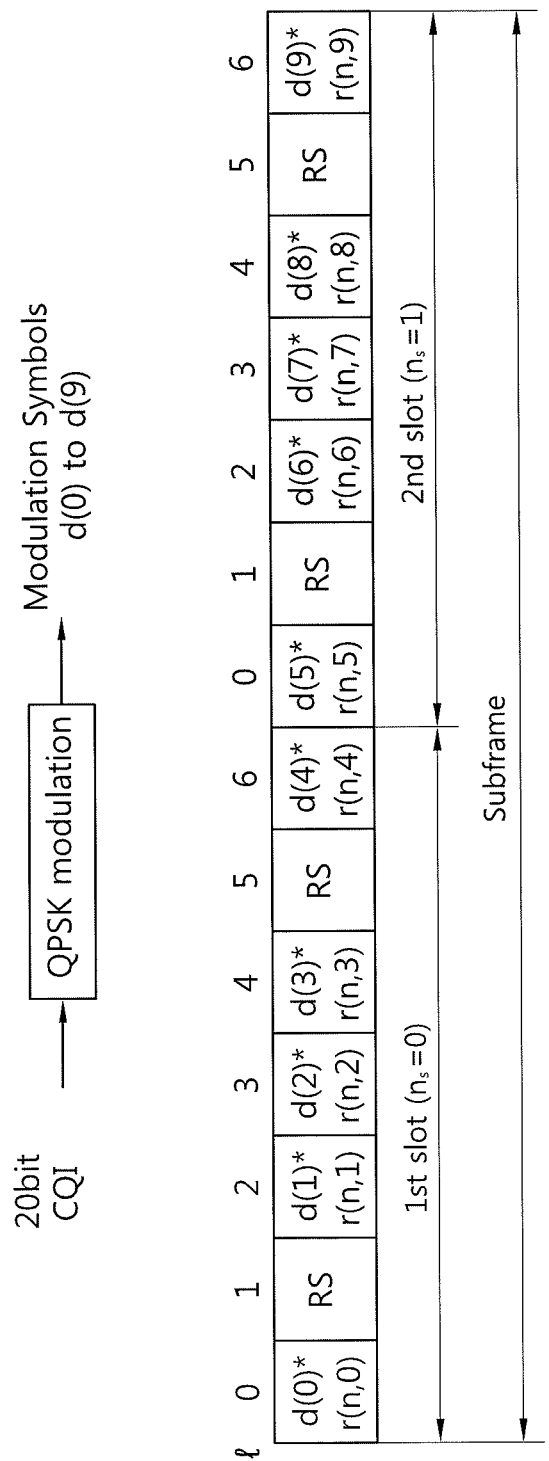
FIG. 10 shows an example of PUCCH format 2/2a/2b transmission when a normal CP is used.

FIG. 10 shows an example of PUCCH format 2/2a/2b transmission when a normal CP is used. Although it is shown herein that RBs belonging to an RB pair occupy the same frequency band in a first slot and a second slot, the RBs may be hopped in a slot level as described in FIG. 7.

Referring to FIG. 10, among 7 OFDM symbols included in each slot, an RS is carried on 2 OFDM symbols and a CQI is carried on the remaining 5 OFDM symbols. In this case, the number and locations of symbols used for the RS may change, and the number and locations of symbols used for the CQI may also change.

A UE generates a coded CQI bit by performing channel coding on a CQI information bit. In this case, a block code may be used. A Reed-Muller code family is one example of the block code. In 3GPP LTE, a (20, A) block code is used, where A is a size of the CQI information bit. That is, in the 3GPP LTE, a 20-bit coded CQI bit is generated always irrespective of the size of the CQI information bit.

Table 7 below shows an example of 13 basis sequences for the (20, A) block code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 6

| Orthogonal sequence index | [w(0), w(1)] |
|---|---|
| 0 | [1 1] |
| 1 | [1 −1] |
| 2 | N/A |

In Table 7, $M_{i,n}$ denotes a basis sequence (where $0 \leq n \leq 12$, n is an integer). The coded CQI bit is generated by linear combination of the 13 basis sequences. Equation 4 below shows an example of the encoded CQI bit $b_i$ (where $0 \leq i \leq 19$, i is an integer).

$$b_i = \sum_{n=0}^{A-1} (a_n \cdot M_{i,n}) \bmod 2 \quad \text{[Equation 4]}$$

In Equation 4, $a_0, a_1, \ldots, a_{A-1}$ denotes the CQI information bit, and A denotes the size of the CQI information bit (where A is a natural number).

The CQI information bit may include one or more fields. Examples of the fields that can be included in the CQI information bit include a CQI field indicating a CQI index for determining an MCS, a precoding matrix indication (PMI) field indicating an index of a precoding matrix selected from a codebook, a rank indication (RI) field indicating a rank, etc.

Table 8 below shows an example of a field included in the CQI information bit and a bit size of the field.

TABLE 8

| Field | Size (bit) |
|---|---|
| Wideband CQI | 4 |

The CQI information bit may include only a 4-bit wideband CQI field. In this case, the size A of the CQI information bit is 4. The wideband CQI field indicates a CQI index for a full band.

Table 9 below shows another example of a field included in the CQI information bit and a bit size of the field.

TABLE 9

| | Size (bit) | | | |
|---|---|---|---|---|
| | 2 antennas | | 4 antennas | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| Precoding matrix indication | 2 | 1 | 4 | 4 |

The CQI information bit may include a wideband CQI field, a spatial differential CQI field, and a PMI field. The spatial differential CQI field indicates a difference between a CQI index for a full band for a first codeword and a CQI index for a full band for a second codeword. A size of each field may differ depending on a rank and the number of transmit antennas of a BS. For example, if the BS uses 4 transmit antennas and the rank is greater than 1, the CQI information bit includes a 4-bit wideband CQI field, a 3-bit spatial difference CQI field, and a 4-bit PMI field (A=11).

Table 10 below shows another example of a field included in the CQI information bit and a bit size of the field.

TABLE 10

| | Size (bit) | | |
|---|---|---|---|
| | | 4 antennas | |
| Field | 2 antennas | Max 2 layers | Max 4 layers |
| Rank indication | 1 | 1 | 2 |

A 20-bit coded CQI bit may be scrambled by using a UE-specific scrambling sequence to generate a 20-bit scrambled bit. The 20-bit scrambled bit is mapped to 10 modulation symbols d(0), . . . , d(9) by using QPSK modulation. In the PUCCH format 2a, 1-bit HARQ ACK/NACK information is mapped to one modulation symbol d(10) by using BPSK modulation. In the PUCCH format 2b, 2-bit HARQ ACK/NACK information is mapped to one modulation symbol d(10) by using QPSK modulation. That is, in the PUCCH format 2a, the CQI and the 1-bit HARQ ACK/NACK information are concurrently transmitted, and in the PUCCH format 2b, the CQI and the 2-bit HARQ ACK/NACK information are concurrently transmitted. Herein, d(10) is used for RS generation. d(10) corresponds to one OFDM symbol between two OFDM symbols on which an RS is carried in each slot. In other words, according to d(10), phase modulation is performed on the RS carried on one OFDM symbol in each slot. The PUCCH formats 2a/2b can be supported only for the normal CP. As such, in each of the PUCCH formats 2a and 2b, one modulation symbol is used for RS generation.

A modulated sequence is generated based on a cyclically shifted sequence r(n,Ics) generated from the modulation symbols d(0), . . . , d(9) and a base sequence. A CS index Ics of the cyclically shifted sequence r(n,Ics) may vary depending on a slot number $n_s$ within a radio frame and a symbol index l within a slot. Therefore, the CS index Ics can be expressed by Ics($n_s$,l). Herein, a slot number of the first slot is set to 0, a slot number of the second slot is set to 1, and the CS index is set to Ics(0,0)=0, Ics(0,2)=1, Ics(0,3)=2, Ics(0,4)=3, Ics(0,6)=4, Ics(1,0)=5, Ics(1,2)=6, Ics(1,3)=7, Ics(1,4)=8, and Ics(1,6)=9. However, this is for exemplary purposes only. An RS may use a cyclically shifted sequence generated from the same base sequence as control information.

Unlike the PUCCH formats 1/1a/1b, the PUCCH formats 2/2a/2b do not use an orthogonal sequence.

Figure 11:
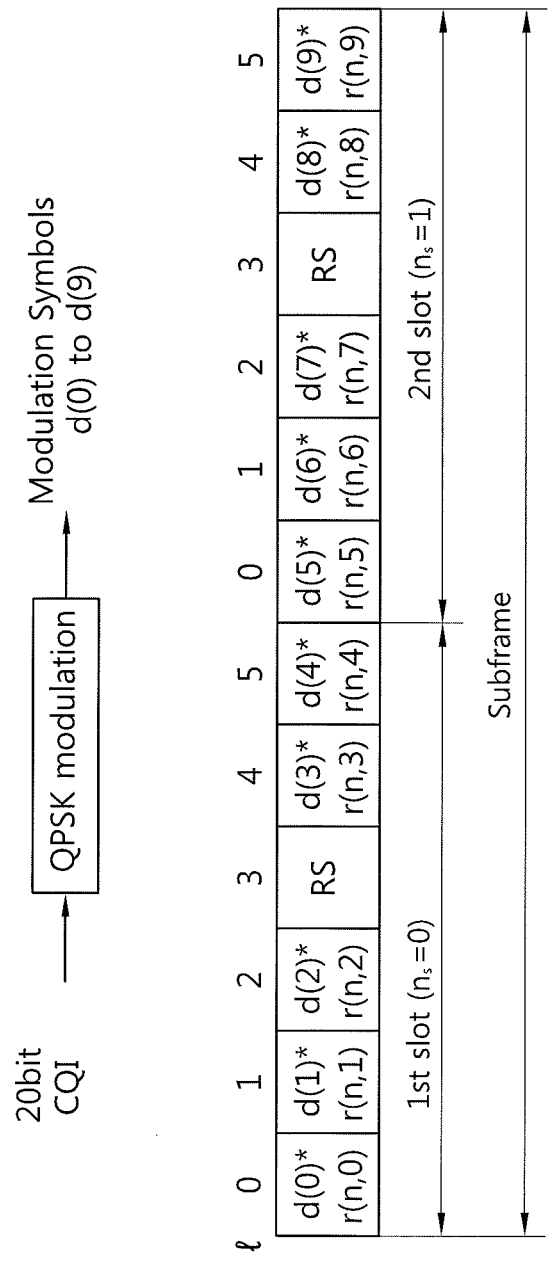
FIG. 11 shows an example of PUCCH format 2/2a/2b transmission when an extended CP is used.

FIG. 11 shows an example of PUCCH format 2/2a/2b transmission when an extended CP is used. Although it is shown herein that RBs belonging to an RB pair occupy the same frequency band in a first slot and a second slot, the RBs may be hopped in a slot level as described in FIG. 7.

Referring to FIG. 11, each of the first slot and the second slot includes 6 OFDM symbols. Among the 6 OFDM symbols of each slot, an RS is carried on one OFDM symbol, and control information is carried on the remaining 5 OFDM symbols. Other than that, the example of FIG. 10 in which the normal CP is used is applied without alteration.

As described above, in both cases of the normal CP and the extended CP, the following information is necessary for PUCCH format 2/2a/2b transmission. A subcarrier (or RB) for transmitting the control information, a CS index Ics for the control information, and a CS index I'cs for the RS are necessary. When a CS interval is 1, the number of indices Ics for the control information and the number of indices I'cs for the RS are 12 each, and thus 12 UEs can be multiplexed per one RB. When the CS interval is 2, the number of indices Ics for the control information and the number of indices I'cs for the RS are 6 each, and thus 6 UEs can be multiplexed per one RB.

Figure 12:
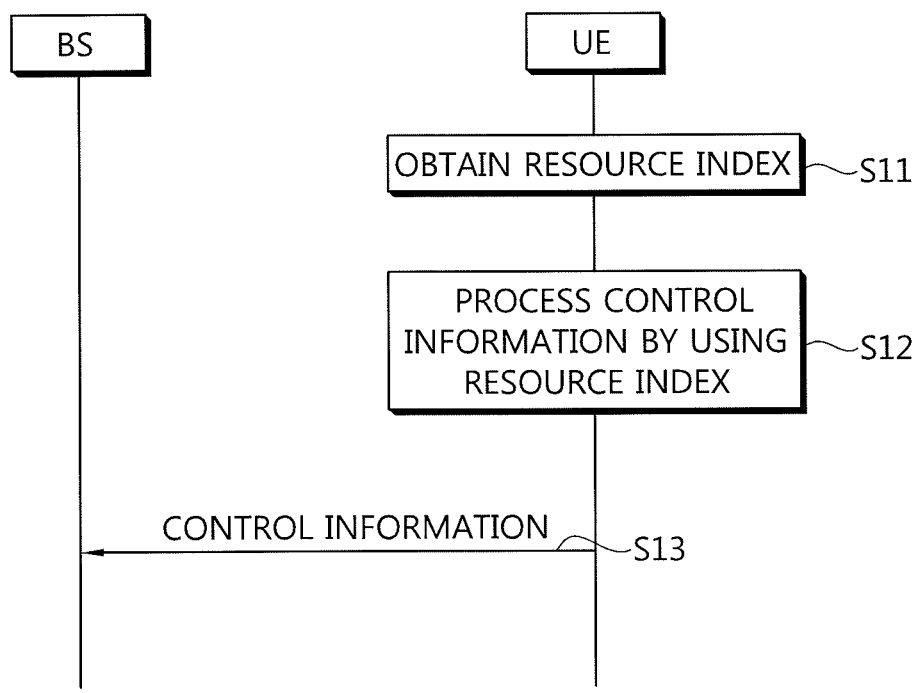
FIG. 12 is a flowchart showing an example of an information transmission method.

FIG. 12 is a flowchart showing an example of an information transmission method.

Referring to FIG. 12, a UE obtains a resource index (step S11). The UE processes information on the basis of the resource index (step S12). The UE transmits the information to a BS (step S13).

A plurality of UEs in a cell can concurrently transmit their information to the BS. In this case, if each UE uses a different resource, the BS can identify information of each UE. The information may be control information, user data, information in which several pieces of control information are mixed, information in which the control information and the user data are multiplexed, etc.

A resource may include at least one of an RB, a frequency-domain sequence, and a time-domain sequence. The RB is a frequency resource for information transmission. The frequency-domain sequence is used to spread a symbol corresponding to the information to a frequency domain. The time-domain sequence is used to spread the symbol to a time domain. When the resource includes the frequency-domain sequence and the time-domain sequence, the frequency-domain sequence and the time-domain sequence are used to spread the symbol to a 2 dimensional time-frequency domain (i.e., the frequency domain and the time domain).

A resource index identifies a resource used for information transmission. According to the resource, the resource index may include at least one of RB information, a frequency-domain sequence index, and a time-domain sequence index. The RB information indicates the RB, the frequency-domain sequence index indicates the frequency-domain sequence, and the time-domain sequence index indicates the time-domain sequence. For example, when the resource includes the RB and the frequency-domain sequence, the resource index may include the RB information and the frequency-domain sequence index.

Hereinafter, a sequence used as the frequency-domain sequence and/or the time-domain sequence will be described in detail. The sequence may be selected from a sequence set having a plurality of sequences as its elements. The plurality of sequences included in the sequence set may be orthogonal to each other, or may have a low correlation with each other.

When the resource includes the sequence, the resource index may include the sequence index. The sequence may be generated based on the sequence index. Hereinafter, the sequence is the frequency-domain sequence and/or the time-domain sequence.

For one example, the sequence index may indicate one sequence selected from the sequence set. Each sequence belonging to the sequence set may one-to-one correspond to one sequence index.

For another example, a sequence index may indicate a CS amount, and a sequence may be generated by cyclically shifting the base sequence by the CS amount.

It is assumed hereinafter that the time-domain sequence is one orthogonal sequence selected from a set of orthogonal sequences, and the frequency-domain sequence is a cyclically shifted sequence generated by cyclically shifting the base sequence by the CS amount. In this case, the time-domain sequence index may be an OS index indicating an orthogonal sequence, and the frequency-domain sequence index may be a CS index indicating a CS amount. However, this is for exemplary purposes only, and is not for restricting the time-domain sequence and/or the frequency-domain sequence.

In case of the PUCCH formats 1/1a/1b, the resource consists of combinations of (1) a CS amount, (2) an orthogonal sequence, and (3) an RB. A resource index indicates a CS index, an OS index, and the RB. For example, if the number of CS indices is 6, the number of OS indices is 3, and the number of RBs is 3, then the total number of resources is 54(=6×3×3). The 54 resources may be numbered with resource indices from 0 to 53. Each of the 54 resources may be allocated to different UEs.

In case of the PUCCH formats 2/2a/2b, the resource consists of combinations of (1) a CS amount and (2) an RB. A resource index indicates a CS index and the RB. For example, the number of CS indices is 6 and the number of RBs is 2, the total number of resources is 12(=6×2). The 12 resources may be numbered with resource indices from 0 to 11. Each of the 12 resources may be allocated to different UEs.

As such, the CS index and the RB are determined from the resource index. In case of the PUCCH formats 1/1a/1b, the OS index is also determined from the resource index. For example, a location index m indicating a logical frequency-domain location of an RB pair allocated to a PUCCH in a subframe may be determined from the resource index.

Figure 13:
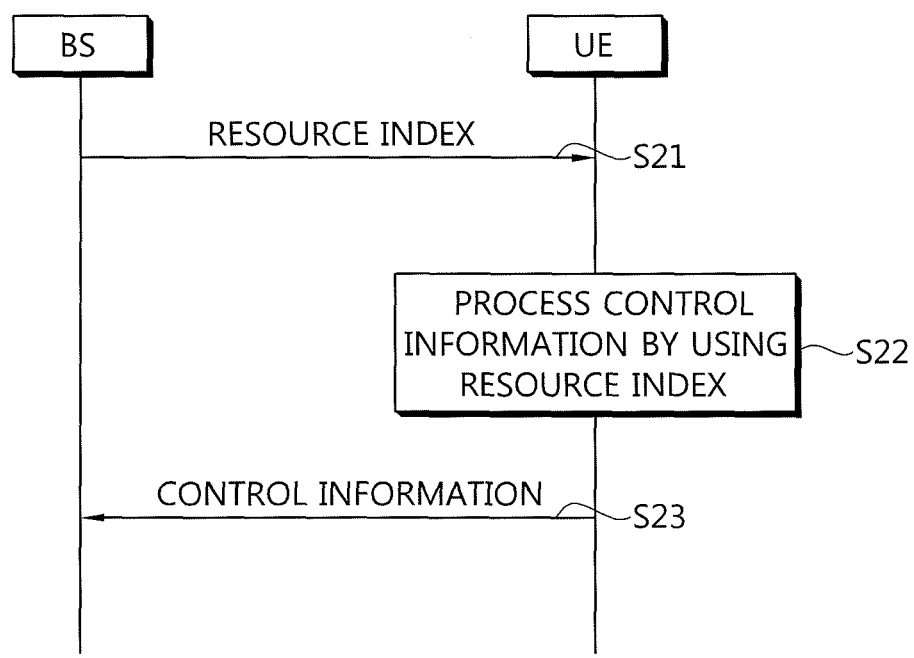
FIG. 13 is a flowchart showing another example of an information transmission method.

FIG. 13 is a flowchart showing another example of an information transmission method.

Referring to FIG. 13, a BS transmits a resource index to a UE (step S21). The UE processes information on the basis of the resource index (step S22). The UE transmits the information to the BS (step S23). As such, the BS may explicitly report the resource index to the UE. The resource index may be configured by higher-layer signaling. For example, a higher layer of a physical layer may be a radio resource control (RRC) layer that controls a radio resource between the UE and a network. In this case, information transmitted by the UE may be an SR, semi-persistent scheduling (SPS), an ACK/NACK, a CQI, etc. The SPS ACK/NACK is an HARQ ACK/NACK for DL data transmitted using the SPS. When the DL data is transmitted through a PDSCH, a PDCCH corresponding to the PDSCH may not exist.

Figure 14:
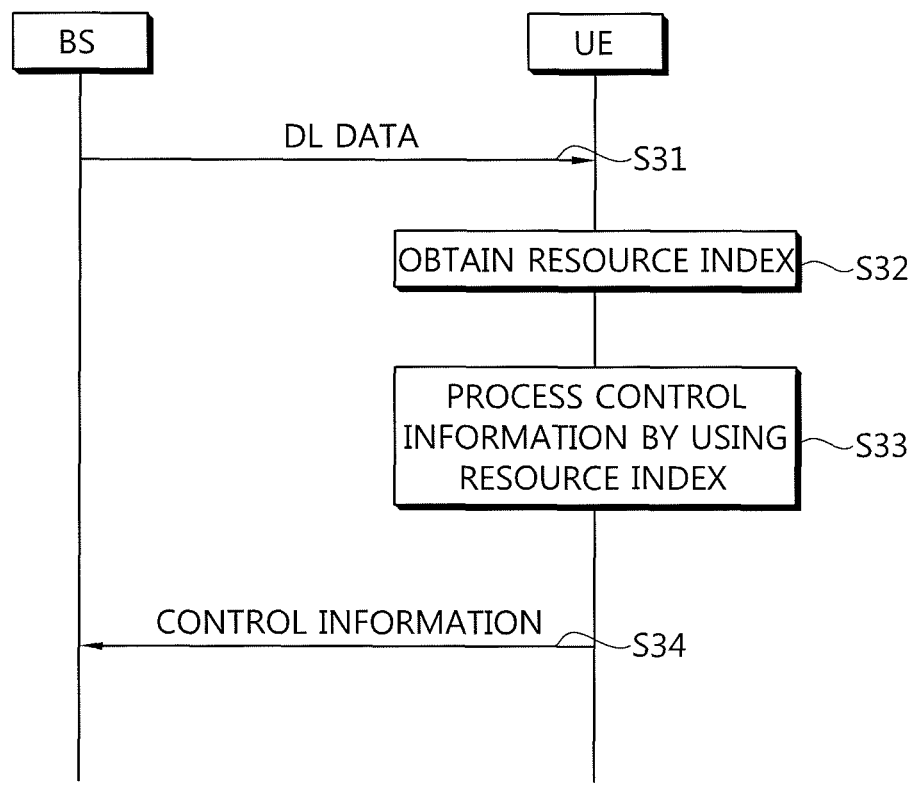
FIG. 14 is a flowchart showing another example of an information transmission method.

FIG. 14 is a flowchart showing another example of an information transmission method.

Referring to FIG. 14, a BS transmits DL data to a UE (step S31). The UE obtains a resource index (step S32). In this case, the resource index may be obtained from a radio resource used to transmit a control channel for receiving DL data. The UE processes information on the basis of the resource index (step S33). The UE transmits the information to the BS (step S34). As such, the BS may implicitly report the resource index to the UE. In this case, information transmitted by the UE may be a dynamic ACK/NACK. The dynamic ACK/NACK is an ACK/NACK for DL data transmitted using dynamic scheduling. In the dynamic scheduling, a DL grant is transmitted to the UE through the PDCCH whenever the BS transmits DL data through the PDSCH.

Equation 5 below shows an example of determining a resource index 'In' for dynamic ACK/NACK transmission.

$$In = n(\text{CCE}) + N_{PUCCH}^{(1)} \qquad \text{[Equation 5]}$$

In Equation 5, n(CCE) denotes a first CCE index used in PDCCH transmission for a PDSCH, and $N^{(1)}_{PUCCH}$ denotes the number of resource indices allocated for an SR and an SPS ACK/NACK. $N^{(1)}_{PUCCH}$ may be determined by a higher layer such as an RRC layer.

Therefore, the BS can control a resource for ACK/NACK transmission by controlling the first CCE index used in PDCCH transmission.

Figure 15:
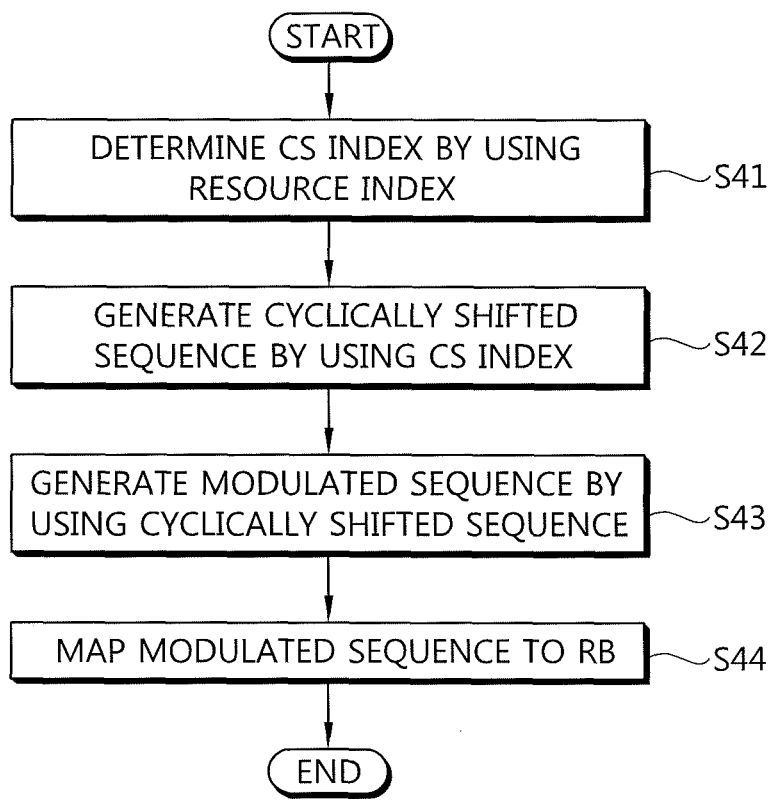
FIG. 15 is a flowchart showing an example of an information processing method based on a resource index.

FIG. 15 is a flowchart showing an example of an information processing method based on a resource index.

Referring to FIG. 15, a UE determines a CS index on the basis of the resource index (step S41). The UE generates a cyclically shifted sequence on the basis of the CS index (step S42). The cyclically shifted sequence may be generated by cyclically shifting a base sequence by a CS amount obtained from the CS index. The UE generates a modulated sequence on the basis of the cyclically shifted sequence and a symbol for information (step S43). The UE maps the modulated sequence to an RB (step S44). The RB may be determined based on the resource index. The UE transmits the modulated sequence. In this case, the information transmitted by the UE may be a CQI.

Figure 16:
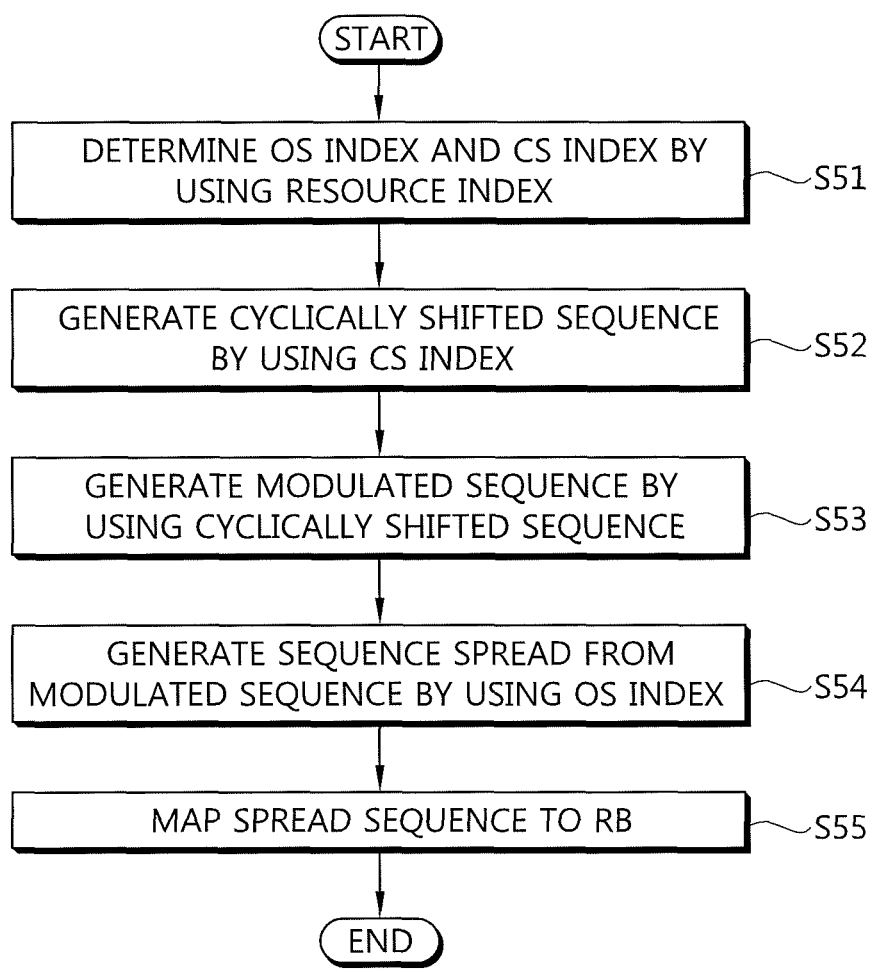
FIG. 16 is a flowchart showing another example of an information processing method based on a resource index.

FIG. 16 is a flowchart showing another example of an information processing method based on a resource index.

Referring to FIG. 16, a UE determines an OS index and a CS index on the basis of the resource index (step S51). The UE generates a cyclically shifted sequence on the basis of the CS index (step S52). The UE generates a modulated sequence on the basis of the cyclically shifted sequence and a symbol for information (step S53). The UE generates a sequence spread from the modulated sequence on the basis of the OS index (step S54). The UE maps the spread sequence to an RB (step S55). The RB may be determined on the basis of the resource index. The UE transmits the spread sequence. In this case, the information transmitted by the UE may be an SR, an HARQ ACK/NACK, etc.

As described up to now, UL information for each of a plurality of UEs in a cell can be multiplexed in a subframe by using code division multiplexing (CDM) and/or frequency division multiplexing (FDM). The plurality of UEs can transmit information simultaneously to a BS by using different resources. The BS may identify each UE's information transmitted simultaneously.

The UE may transmit the information through a plurality of transmit (Tx) antennas. Among MIMO techniques, a Tx diversity scheme has a diversity gain, and can increase reliability of radio communication. Examples of the Tx diversity scheme includes cyclic delay diversity (CDD), precoding vector switching (PVS), etc. However, the use of these schemes may cause problems in that orthogonality is not maintained, a Tx diversity gain is limited, or backward compatibility with 3GPP LTE is not satisfied. Therefore, there is a need for a method of information transmission by using the Tx diversity scheme capable of solving the aforementioned problems.

Figure 17:
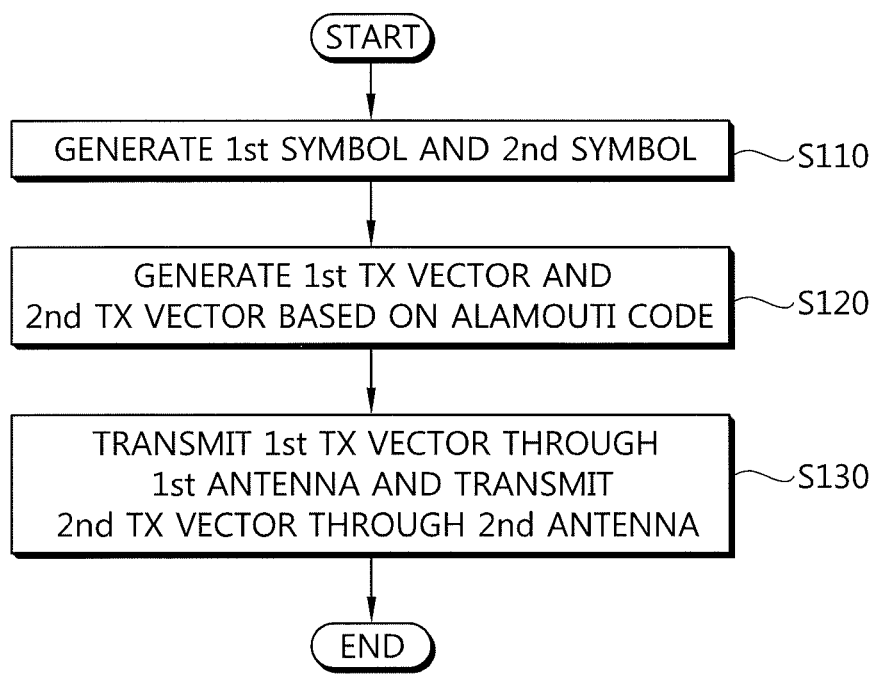
FIG. 17 is a flowchart showing an information transmission method according to an embodiment of the present invention.

FIG. 17 is a flowchart showing an information transmission method according to an embodiment of the present invention.

Referring to FIG. 17, a UE generates $1^{st}$ and $2^{nd}$ symbols corresponding to information (step S110). The UE generates $1^{st}$ and $2^{nd}$ Tx vectors from the $1^{st}$ and $2^{nd}$ symbols on the basis of an Alamouti code (step S120). The UE transmits the $1^{st}$ Tx vector through a $1^{st}$ antenna, and transmits the $2^{nd}$ Tx vector through a $2^{nd}$ antenna (step S130). In this case, the $1^{st}$ Tx vector consists of $1^{st}$ and $2^{nd}$ Tx symbols. The $1^{st}$ Tx symbol is transmitted based on a $1^{st}$ resource index, and the $2^{nd}$ Tx symbol is transmitted based on a $2^{nd}$ resource index. The $2^{nd}$ Tx vector consists of $3^{rd}$ and $4^{th}$ Tx symbols. The $3^{rd}$ Tx symbol is transmitted based on the $1^{st}$ resource index, and the $4^{th}$ Tx symbol is transmitted based on the $2^{nd}$ resource index.

Space block coding (SBC) using a resource is used in the information transmission method. The UE may obtain a diversity gain by performing smart repetition by using an antenna and a resource. A spatial multiplexing rate is 1. Hereinafter, such an information transmission method is referred to as an SBC information transmission method.

Each of the $1^{st}$ and $2^{nd}$ symbols may be one complex-valued symbol or a plurality of complex-valued symbols. A plurality of complex-valued symbols may be referred to as a sequence or a signal. The $1^{st}$ symbol and the $2^{nd}$ symbol can be respectively referred to as a $1^{st}$ signal and a $2^{n}$ signal. Each of the $1^{st}$ and $2^{nd}$ symbols may be generated by modulating an information bit corresponding to information. In this case, each of the $1^{st}$ symbol and the $2^{nd}$ symbol may be one modulation symbol or a plurality of modulation symbols. Herein, the $1^{st}$ symbol may be referred to as a $1^{st}$ modulation symbol and the $2^{nd}$ symbol may be referred to as a $2^{nd}$ modulation symbol.

The $1^{st}$ resource index and the $2^{nd}$ resource index are different from each other. Since the $1^{st}$ resource index and the $2^{nd}$ resource index are different from each other, orthogonality may be maintained between the Tx antennas. If the $1^{st}$ resource index and the $2^{nd}$ resource index are identical to each other, information may be transmitted through one antenna without having to transmit the information by using a Tx diversity scheme.

Each of the $1^{st}$ to $4^{th}$ Tx symbols can be transmitted in PUCCH formats 1/1a/1b or PUCCH formats 2/2a/2b. In addition to the PUCCH formats 1/1a/1b or the PUCCH formats 2/2a/2b, the SBC information transmission method is applicable to all CDM-based transmission methods.

The $1^{st}$ Tx symbol generates a $1^{st}$ Tx sequence based on the $1^{st}$ resource index. The $2^{nd}$ Tx symbol generates a $2^{nd}$ Tx sequence based on the $2^{nd}$ resource index. The $3^{rd}$ Tx symbol generates a $3^{rd}$ Tx sequence based on the $1^{st}$ resource index. The $4^{th}$ Tx symbol generates a $4^{th}$ Tx sequence based on the $2^{nd}$ resource index.

The $1^{st}$ Tx sequence and the $2^{nd}$ Tx sequence may be combined and transmitted through the $1^{st}$ antenna. The $2^{nd}$ Tx sequence and the $4^{th}$ Tx sequence may be combined and transmitted through the $2^{nd}$ antenna. To decrease a cubic metric (CM), a phase of at least one Tx sequence may change when combining one Tx sequence to another Tx sequence. For example, the UE may combine the $2^{nd}$ Tx sequence and the $1^{st}$ Tx sequence by phase-shifting the $2^{nd}$ Tx sequence by a specific phase. In addition, the UE may combine the $4^{th}$ Tx sequence and the $3^{rd}$ Tx sequence by phase-shifting the $4^{th}$ Tx sequence by the specific phase. In case of BPSK, the specific phase may be 90 degrees. In case of QPSK, the specific phase may be 45 degrees.

For channel estimation for each of the $1^{st}$ and $2^{nd}$ antennas, two resources have to be allocated to a reference signal (RS) part. Resources allocated to an information part are not one-to-one mapped to the antennas, but resources allocated to the RS part can be one-to-one mapped to the antennas. When the resources allocated to the RS part are one-to-one mapped to the resources, it is possible to achieve orthogonal channel estimation for each antenna.

In case of a normal cyclic prefix (CP) of the PUCCH formats 2/2a/2b, an RS is carried on 2 OFDM symbols in one slot. The 2 OFDM symbols on which the RS is carried are referred to as a $1^{st}$ RS symbol and a $2^{nd}$ RS symbol, respectively. When information is transmitted using the SBC information transmission method through 2 Tx antennas by allocating two resources, in the $1^{st}$ RS symbol, a $1^{st}$ resource may be transmitted through the $1^{st}$ antenna, and a $2^{nd}$ resource may be transmitted through the $2^{nd}$ antenna. In the $2^{nd}$ RS symbol, the $1^{st}$ resource may be transmitted through the $2^{nd}$ antenna, and the $2^{nd}$ resource may be transmitted through the $1^{st}$ antenna. That is, resource swapping are achieved across two RS symbols. When each resource consists of a different resource block (RB), channel estimation can be achieved for each antenna of the RB. The resource swapping operation in a slot level may also be performed in a subframe level.

Figure 18:
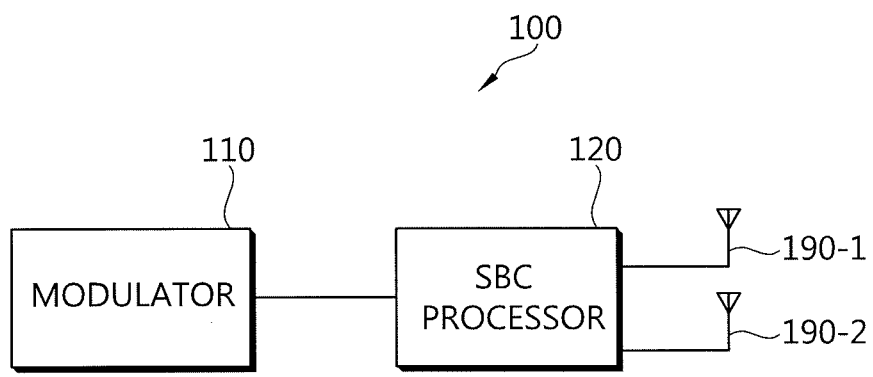
FIG. 18 is a block diagram showing a transmitter for implementing an embodiment of the present invention.

FIG. 18 is a block diagram showing a transmitter for implementing an embodiment of the present invention. The transmitter may be a part of an apparatus for radio communication. The apparatus for radio communication may be a UE or a BS.

Referring to FIG. 18, a transmitter 100 includes a modulator 110, an SBC processor 120, and two Tx antennas 190-1 and 190-2.

An information bit is input to the modulator 110. A plurality of information bits are also referred to as a bit stream. Alternatively, coded bits obtained when a channel coding unit (not shown) performs channel coding on the information bit may be input to the modulator 110. The modulator 110 generates $1^{st}$ and $2^{nd}$ symbols by mapping the information bit to a modulation symbol representing a location on a constellation.

The information bit corresponds to information to be transmitted by the transmitter 100.

A modulation scheme is not limited to a particular scheme, and thus may be m-phase shift keying (m-PSK) or m-quadrature amplitude modulation (m-QAM). Each of the $1^{st}$ and $2^{nd}$ symbols may be one or a plurality of complex-valued modulation symbols.

Table 11 below shows an example of a $1^{st}$ symbol $s_1$ and a $2^{nd}$ symbol s2 each of which is generated from the information bit according to the modulation scheme.

TABLE 11

| Modulation scheme | Information bit | 1st symbol($s_1$) | 2nd symbols($s_2$) |
|---|---|---|---|
| BPSK | b(0), b(1) | d(0) | d(1) |
| BPSK/QPSK | b(0)/b(1), b(2) | d(0) | d(1) |
| QPSK | b(0), b(1), b(2), b(3) | d(0) | d(1) |
| QPSK | b(0), b(1), ..., b(39) | d(0), d(1), ..., d(9) | d(10), d(11), ..., d(19) |

As such, the transmitted information bit may have various bit sizes. Different modulation scheme may be applied to the $1^{st}$ symbol and the $2^{nd}$ symbol. For example, BPSK may be applied to the $1^{st}$ symbol, and QPSK may be applied to the $2^{nd}$ symbol. In addition to the example of Table 11 above, various modulation schemes may be used for the information bit with various bit sizes.

The information may be divided into $1^{st}$ information and $2^{nd}$ information. That is, the information may include the $1^{st}$ information and the $2^{nd}$ information. In this case, the information bit corresponding to the information is generated by combining the $1^{st}$ information and the $2^{nd}$ information.

Table 12 below shows a relation between the information bit and the $1^{st}/2^{nd}$ information.

TABLE 12

| Information bit | 1st information | 2nd information |
|---|---|---|
| b(0), b(1) | b(0) | b(1) |
| b(0), b(1), b(2) | b(0) | b(1), b(2) |
|  | b(0), b(1) | b(2) |
| b(0), b(1), b(2), b(3) | b(0), b(1) | b(2), b(3) |
|  | b(0), b(2) | b(1), b(3) |
| b(0), b(1), ..., b(39) | b(0), b(1), b(2), ..., b(19) | b(20), b(21), b(22), ..., b(39) |
|  | b(0), b(2), b(4), ..., b(38) | b(1), b(3), b(5), ..., b(39) |

In addition to the example of Table 12 above, the $1^{st}$ information and the $2^{nd}$ information may be combined in various manners to generate the information bit. For example, the $1^{st}$ symbol may be a $1^{st}$ modulation symbol for the $1^{st}$ information, and the $2^{nd}$ symbol may be a $2^{nd}$ modulation symbol for the $2^{nd}$ information.

Hereinafter, examples of the $1^{st}$ information and the $2^{nd}$ information will be described. The $1^{st}$ information and the $2^{nd}$ information may be different control information, different user data, etc.

For example, the $1^{st}$ information and the $2^{nd}$ information may be control information for different DL carriers. The $1^{st}$ information may be $1^{st}$ control information for a $1^{st}$ DL carrier, and the $2^{nd}$ information may be $2^{nd}$ control information for a $2^{nd}$ DL carrier. More specifically, the $1^{st}$ information may be a $1^{st}$ ACK/NACK for $1^{st}$ data transmitted on the $1^{st}$ DL carrier, and the $2^{nd}$ information may be a $2^{nd}$ ACK/NACK for $2^{nd}$ data transmitted on the $2^{nd}$ DL carrier. Alternatively, the $1^{st}$ information may be a $1^{st}$ CQI for the $1^{st}$ DL carrier, and the $2^{nd}$ information may be a $2^{nd}$ CQI for the $2^{nd}$ DL carrier. In this case, information for each of the $1^{st}$ DL carrier and the $2^{nd}$ DL carrier may be transmitted on one UL carrier. Therefore, the SBC information transmission method may be used in an asymmetric multi-carrier system in which the number of DL carriers is greater than the number of UL carriers. For example, the method can be used in a multiple-carrier system in which a ratio of the number of DL carriers to the number of UL carriers is 2:1.

For another example, the $1^{st}$ information and the $2^{nd}$ information may be control information for different codeword groups. Each codeword group includes at least one codeword. Each codeword group may include a different codeword. A $1^{st}$ codeword group may include a $1^{st}$ codeword, and a $2^{nd}$ codeword group may include a $2^{nd}$ codeword. Alternatively, the $1^{st}$ codeword group may include the $1^{st}$ codeword and the $2^{nd}$ codeword, and the $2^{nd}$ codeword group may include a $3^{rd}$ codeword and a $4^{th}$ codeword. Alternatively, the $1^{st}$ codeword group may include the $1^{st}$ codeword, and the $2^{nd}$ codeword group may include the $2^{nd}$ codeword and the $3^{rd}$ codeword.

The $1^{st}$ information may be $1^{st}$ control information for the $1^{st}$ codeword group, and the $2^{nd}$ information may be $2^{nd}$ control information for the $2^{nd}$ codeword group. More specifically, the $1^{st}$ information may be a $1^{st}$ CQI for the $1^{st}$ codeword group, and the $2^{nd}$ information may be a $2^{nd}$ CQI for the $2^{nd}$ codeword group. Alternatively, the $1^{st}$ information may be a $1^{st}$ ACK/NACK for the $1^{st}$ codeword group, and the $2^{nd}$ information may be a $2^{nd}$ ACK/NACK for the $2^{nd}$ codeword group.

For example, if there is a need to transmit HARQ ACK/NACK information for 4 codewords, HARQ ACK/NACK information for 2 codewords may be transmitted as the $1^{st}$ information and HARQ ACK/NACK information for the remaining 2 codewords may be transmitted as the $2^{nd}$ information. Each of the $1^{st}$ information and the $2^{nd}$ information has a length of 2 bits. The $1^{st}$ information may be mapped to the $1^{st}$ symbol by using QPSK modulation, and the $2^{nd}$ information may be mapped to the $2^{nd}$ symbol by using QPSK modulation. As such, the PUCCH format 1b of 3GPP LTE (Release 8) may be extendedly applied to transmit 4-bit HARQ ACK/NACK information.

A system supporting 4 codewords may have 2 DL carriers, and the number of codewords for each DL carrier may be 2. A system supporting 2 codewords may have 2 DL carriers, and the number of codewords for each DL carrier may be 1.

For another example, each of the $1^{st}$ information and the $2^{nd}$ information may be representative information. The representative information is one piece of information that represents a plurality of pieces of information. When the plurality of pieces of information are indicated by one piece of representative information, it is called information bundling. Examples of the representative information include a representative CQI, a representative ACK/NACK, a representative PMI, etc. The representative CQI may be one CQI for all of a plurality of DL carriers. For example, the representative CQI may be an average CQI of respective CQIs for the plurality of DL carriers. Alternatively, the representative CQI may be one CQI representing the respective CQIs for a plurality of codewords. The representative ACK/NACK may be one HARQ ACK/NACK for individual data transmitted on the plurality of DL carriers. For example, when individual data transmitted on the plurality of DL carriers is successfully decoded, the representative ACK/NACK is an ACK, and otherwise, the representative ACK/NACK is an NACK. Alternatively, the representative ACK/NACK may be one HARQ ACK/NACK representing respective ACKs/NACKs for the plurality of codewords. The $1^{st}$ information may be $1^{st}$ representative information for a $1^{st}$ DL carrier group, and the $2^{nd}$ information may be $2^{nd}$ representative information for a $2^{nd}$ DL carrier group. The $1^{st}$ DL carrier group may include the $1^{st}$ DL carrier and the $2^{nd}$ DL carrier, and the $2^{nd}$ DL carrier group may include a $3^{rd}$ DL carrier and a $4^{th}$ DL carrier. Alternatively, the $1^{st}$ information may be $1^{st}$ representative information for the $1^{st}$ codeword group, and the $2^{nd}$ information may be $2^{nd}$ representative information for the $2^{nd}$ codeword group.

Table 13 below shows an example of a constellation mapping method for generating a $1^{st}$ symbol (i.e., $s_1 = I_1 + j Q_1$) and a $2^{nd}$ symbol (i.e., $s_2 = I_2 + j Q_2$) from a 4-bit information bit (i.e., b(0), b(1), b(2), b(3)).

TABLE 13

| b(0), b(1), b(2), b(3) | 1st symbol($s_1$) | | 2nd symbols($s_2$) | |
|---|---|---|---|---|
| | $I_1$ | $Q_1$ | $I_2$ | $Q_2$ |
| 0000 | $-1/\sqrt{2}$ | $-1/\sqrt{2}$ | 0 | 0 |
| 0001 | $-1/\sqrt{2}$ | 0 | 0 | $-1/\sqrt{2}$ |
| 0010 | 0 | $-1/\sqrt{2}$ | $-1/\sqrt{2}$ | 0 |
| 0011 | 0 | 0 | $-1/\sqrt{2}$ | $-1/\sqrt{2}$ |
| 0100 | $-1/\sqrt{2}$ | 0 | 0 | $1/\sqrt{2}$ |
| 0101 | $-1/\sqrt{2}$ | $1/\sqrt{2}$ | 0 | 0 |
| 0110 | 0 | 0 | $-1/\sqrt{2}$ | $1/\sqrt{2}$ |
| 0111 | 0 | $1/\sqrt{2}$ | $-1/\sqrt{2}$ | 0 |
| 1000 | 0 | $-1/\sqrt{2}$ | $1/\sqrt{2}$ | 0 |
| 1001 | 0 | 0 | $1/\sqrt{2}$ | $-1/\sqrt{2}$ |
| 1010 | $1/\sqrt{2}$ | $-1/\sqrt{2}$ | 0 | 0 |
| 1011 | $1/\sqrt{2}$ | 0 | 0 | $-1/\sqrt{2}$ |
| 1100 | 0 | 0 | $1/\sqrt{2}$ | $1/\sqrt{2}$ |
| 1101 | 0 | $1/\sqrt{2}$ | $1/\sqrt{2}$ | 0 |
| 1110 | $1/\sqrt{2}$ | 0 | 0 | $1/\sqrt{2}$ |
| 1111 | $1/\sqrt{2}$ | $1/\sqrt{2}$ | 0 | 0 |

When the information bit is '0000', the $2^{nd}$ symbol is 0. In this case, the $2^{nd}$ symbol is not transmitted, and only the $1^{st}$ symbol is transmitted.

The SBC processor 120 generates a $1^{st}$ Tx vector and a $2^{nd}$ Tx vector on the basis of an Alamouti code from the $1^{st}$ and $2^{nd}$ symbols output from the modulator 110. The $1^{st}$ antenna 190-1 transmits the $1^{st}$ Tx vector, and the $2^{nd}$ antenna 190-2 transmits the $2^{nd}$ Tx vector. The $1^{st}$ Tx vector consists of a $1^{st}$ Tx symbol and a $2^{nd}$ Tx symbol, and the $2^{nd}$ Tx vector consists of a $3^{rd}$ Tx symbol and a $4^{th}$ Tx symbol. The $1^{st}$ Tx symbol is transmitted based on a $1^{st}$ resource index, and the $2^{nd}$ Tx symbol is transmitted based on a $2^{nd}$ resource index. The $3^{rd}$ Tx symbol is transmitted based on the $1^{st}$ resource index, and the $4^{th}$ Tx symbol is transmitted based on the $2^{nd}$ resource index.

Hereinafter, a Tx matrix is defined as a 2×2 matrix of which a $1^{st}$ column is the $1^{st}$ Tx vector and a $2^{nd}$ column is the $2^{nd}$ Tx vector. An element of an $i^{th}$ row and a $j^{th}$ column of the Tx matrix is expressed by (i,j) (where i=1, 2 and j=1,2). (1,1) and (2,1) respectively denote the $1^{st}$ Tx symbol and the $2^{nd}$ Tx symbol of the $1^{st}$ Tx vector. (1,2) and (2,2) respectively denote the $3^{rd}$ Tx symbol and the $4^{th}$ Tx symbol of the $2^{nd}$ Tx vector. The $1^{st}$ Tx symbol and the $4^{th}$ Tx symbol have a complex conjugate relation. The $2^{nd}$ Tx symbol and the $3^{rd}$ Tx symbol have a complex conjugate relation. A negative sign is appended to any one of the $1^{st}$ Tx symbol to the $4^{th}$ Tx symbol.

Table 14 below shows various examples of the Tx matrix.

TABLE 14

| (1) | $\begin{bmatrix} s_1 & s_2 \\ -s_2^* & s_1^* \end{bmatrix}$ | (5) | $\begin{bmatrix} s_1 & -s_2 \\ s_2^* & s_1^* \end{bmatrix}$ |
| (2) | $\begin{bmatrix} s_1^* & s_2 \\ -s_2^* & s_1 \end{bmatrix}$ | (6) | $\begin{bmatrix} s_1^* & -s_2 \\ s_2^* & s_1 \end{bmatrix}$ |
| (3) | $\begin{bmatrix} s_1 & s_2^* \\ -s_2 & s_1^* \end{bmatrix}$ | (7) | $\begin{bmatrix} s_1 & -s_2^* \\ s_2 & s_1^* \end{bmatrix}$ |
| (4) | $\begin{bmatrix} s_1^* & s_2^* \\ -s_2 & s_1 \end{bmatrix}$ | (8) | $\begin{bmatrix} s_1^* & -s_2^* \\ s_2 & s_1 \end{bmatrix}$ |

In case of the example (7) of Table 14, the $1^{st}$ Tx symbol is generated based on the $1^{st}$ symbol, the $2^{nd}$ Tx symbol is generated based on the $2^{nd}$ symbol, the $3^{rd}$ Tx symbol is obtained by appending a negative sign to a complex conjugate of the $2^{nd}$ Tx symbol, and the $4^{th}$ Tx symbol is a complex conjugate of the $1^{st}$ Tx symbol.

Table 15 below shows another example of the Tx matrix.

TABLE 15

| (1) | $\begin{bmatrix} s_1 & s_2 \\ s_2^* & -s_1^* \end{bmatrix}$ | (5) | $\begin{bmatrix} -s_1 & s_2 \\ s_2^* & s_1^* \end{bmatrix}$ |
| (2) | $\begin{bmatrix} s_1^* & s_2 \\ s_2^* & -s_1 \end{bmatrix}$ | (6) | $\begin{bmatrix} -s_1^* & s_2 \\ s_2^* & s_1 \end{bmatrix}$ |
| (3) | $\begin{bmatrix} s_1 & s_2^* \\ s_2 & -s_1^* \end{bmatrix}$ | (7) | $\begin{bmatrix} -s_1 & s_2^* \\ s_2 & s_1^* \end{bmatrix}$ |
| (4) | $\begin{bmatrix} s_1^* & s_2^* \\ s_2 & -s_1 \end{bmatrix}$ | (8) | $\begin{bmatrix} -s_1^* & s_2^* \\ s_2 & s_1 \end{bmatrix}$ |

Referring to Table 15, the $3^{rd}$ Tx symbol is a complex conjugate of the $2^{nd}$ Tx symbol, and the $4^{th}$ Tx symbol is obtained by appending a negative sign to a complex conjugate of the $1^{st}$ Tx symbol.

However, this is for exemplary purposes only. In addition to the cases shown in Tables 14 and 15, the Tx matrix generated based on the Alamouti code from the $1^{st}$ symbol and the $2^{nd}$ symbol may have various formats.

A row and/or a column of the Tx matrix may correspond to a Tx antenna and a resource index. It is assumed hereinafter that rows of the matrix respectively correspond to resource indices, and columns of the matrix respectively correspond to Tx antennas. In this case, the $1^{st}$ Tx symbol is processed with the $1^{st}$ resource index, the $2^{nd}$ Tx symbol is processed with the $2^{nd}$ resource index, and then transmission is performed through the $1^{st}$ antenna. The $3^{rd}$ Tx symbol is processed with the $1^{st}$ resource index, the $4^{th}$ Tx symbol is processed with the $2^{nd}$ resource index, and then transmission is performed through the $2^{nd}$ antenna.

Table 16 shows an example of a Tx matrix generated from a 4-bit information bit. Herein, a $1^{st}$ symbol $S_1$ and a $2^{nd}$ symbol $s_2$ are generated from the information bit according to Table 13 above, and the Tx matrix is generated according to the example (1) of Table 14 above.

TABLE 16

| Information bit | 1st symbol($s_1$) | 2nd symbols($s_2$) | Transmit matrix |
|---|---|---|---|
| 0000 | $-\frac{1}{\sqrt{2}} - j\frac{1}{\sqrt{2}}$ | 0 | $\begin{bmatrix} -\frac{1}{\sqrt{2}} - j\frac{1}{\sqrt{2}} & 0 \\ 0 & -\frac{1}{\sqrt{2}} + j\frac{1}{\sqrt{2}} \end{bmatrix}$ |
| 0001 | $-\frac{1}{\sqrt{2}}$ | $-j\frac{1}{\sqrt{2}}$ | $\begin{bmatrix} -\frac{1}{\sqrt{2}} & -j\frac{1}{\sqrt{2}} \\ -j\frac{1}{\sqrt{2}} & -\frac{1}{\sqrt{2}} \end{bmatrix}$ |
| 0010 | $-j\frac{1}{\sqrt{2}}$ | $-\frac{1}{\sqrt{2}}$ | $\begin{bmatrix} -j\frac{1}{\sqrt{2}} & -\frac{1}{\sqrt{2}} \\ -\frac{1}{\sqrt{2}} & j\frac{1}{\sqrt{2}} \end{bmatrix}$ |

Referring to Table 16, if the information bit is '0000', it is equivalent to the case (see Table 13) where the information bit '0000' is transmitted based on the $1^{st}$ resource index and the $2^{nd}$ resource index through the $1^{st}$ antenna, and the information bit '0110' is transmitted based on the $1^{st}$ resource index and the $2^{nd}$ resource index through the $2^{nd}$ antenna.

When Tx power is limited, a normalization factor corresponding to the number of Tx antennas may be used in general. Equation 6 below shows an example of the normalization factor.

$$\frac{1}{\sqrt{Ntx \times Nc}} \quad \text{[Equation 6]}$$

In Equation 6, Ntx denotes the number of Tx antennas, and Nc denotes the number of resources per antenna.

A Tx matrix having the format of the example (7) of Table 14 can be generated by Equation 7 below.

$$\begin{bmatrix} s(1) \\ s(2) \\ s(3) \\ s(4) \end{bmatrix} = \frac{1}{\sqrt{4}} \begin{bmatrix} 1 & 0 & j & 0 \\ 0 & 1 & 0 & j \\ 0 & -1 & 0 & j \\ 1 & 0 & -j & 0 \end{bmatrix} \begin{bmatrix} Re(s_1) \\ Re(s_2) \\ Im(s_1) \\ Im(s_2) \end{bmatrix} \quad \text{[Equation 7]}$$

In Equation 7, $s_1$ denotes a $1^{st}$ symbol, $s_1$ denotes a $2^{nd}$ symbol, and s(k) denotes a $k^{th}$ Tx symbol (where k=1, 2, 3, 4). A $1^{st}$ Tx vector consists of s(1) and s(2), and a $2^{nd}$ Tx vector consists of s(3) and s(4). 1/root(4) is a normalization factor.

Equation 7 can be rearranged to Equation 8 below.

$$\begin{bmatrix} s(1) \\ s(2) \\ s(3) \\ s(4) \end{bmatrix} = \frac{1}{\sqrt{4}} \begin{bmatrix} Re(s_1) + jIm(s_1) \\ Re(s_2) + jIm(s_2) \\ -Re(s_2) + jIm(s_2) \\ Re(s_1) - jIm(s_1) \end{bmatrix} \quad \text{[Equation 8]}$$

$$= \frac{1}{\sqrt{4}} \begin{bmatrix} s_1 \\ s_2 \\ -s_2^* \\ s_1^* \end{bmatrix}$$

For convenience of explanation, the normalization factor is omitted in the following descriptions.

Figure 19:
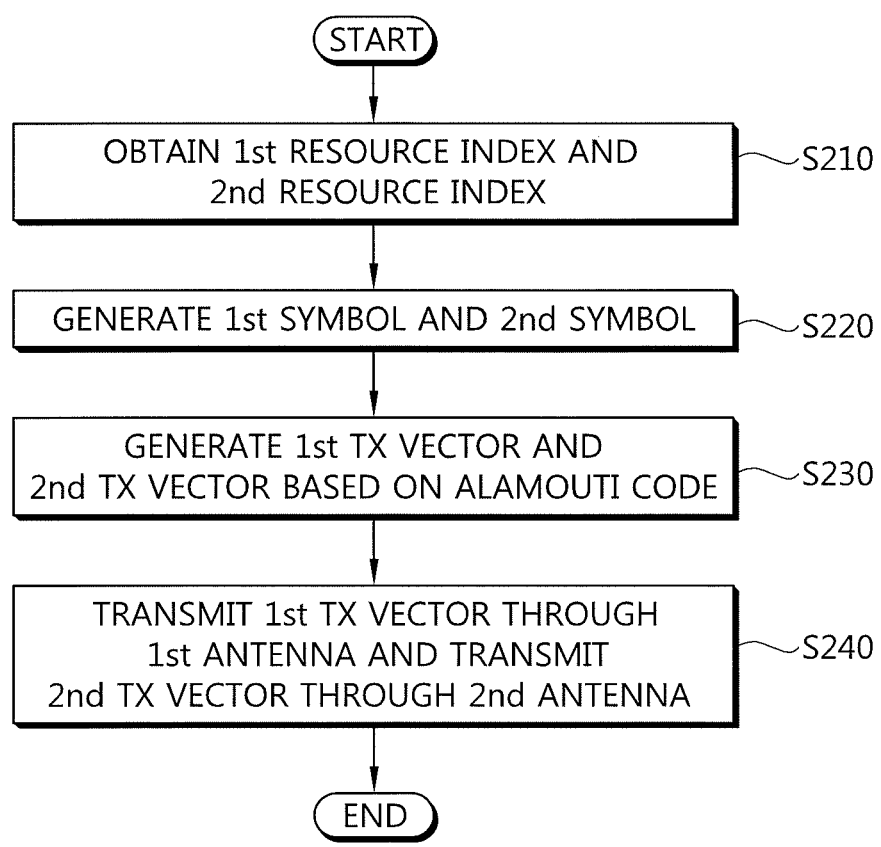
FIG. 19 is a flowchart showing an information transmission method according to another embodiment of the present invention.

FIG. 19 is a flowchart showing an information transmission method according to another embodiment of the present invention.

Referring to FIG. 19, a UE obtains a $1^{st}$ resource index and a $2^{nd}$ resource index (step S210). The UE generates $1^{st}$ and $2^{nd}$ symbols corresponding to information (step S220). The UE generates $1^{st}$ and $2^{nd}$ Tx vectors from the $1^{st}$ and $2^{nd}$ symbols on the basis of an Alamouti code (step S230). The UE transmits the $1^{st}$ Tx vector through a $1^{st}$ antenna, and transmits the $2^{nd}$ Tx vector through a $2^{nd}$ antenna (step S240). In this case, the $1^{st}$ Tx vector consists of $1^{st}$ and $2^{nd}$ Tx symbols. The $1^{st}$ Tx symbol is transmitted based on the $1^{st}$ resource index, and the $2^{nd}$ Tx symbol is transmitted based on the $2^{nd}$ resource index. The $2^{nd}$ Tx vector consists of $3^{rd}$ and $4^{th}$ Tx symbols. The $3^{rd}$ Tx symbol is transmitted based on the $1^{st}$ resource index, and the $4^{th}$ Tx symbol is transmitted based on the $2^{nd}$ resource index.

Hereinafter, a method of obtaining the $1^{st}$ resource index and the $2^{nd}$ resource index will be described.

First, the UE may receive the $1^{st}$ resource index and the $2^{nd}$ resource index from a BS. For example, a plurality of resource indices may be directly signaled in such a manner that the $1^{st}$ resource index is set to 0 and the $2^{nd}$ resource index is set to 2. Second, the UE may implicitly know the $1^{st}$ resource index and the $2^{nd}$ resource index. The $1^{st}$ resource index may be obtained from a radio resource for a physical control channel for receiving $1^{st}$ DL data, and the $2^{nd}$ resource index may be obtained from a radio resource for a physical control channel for receiving $2^{nd}$ DL data. For example, the $1^{st}$ resource index may be determined by using a $1^{st}$ CCE index used for PDCCH transmission on a $1^{st}$ DL carrier, and the $2^{nd}$ resource index may be determined by using a $1^{st}$ CCE index used for PDCCH transmission on a $2^{nd}$ DL carrier. Third, the UE may receive the $1^{st}$ resource index from the BS and obtain the $2^{nd}$ resource index from the $1^{st}$ resource index. In this case, the $2^{nd}$ resource index is predetermined according to the $1^{st}$ resource index. For example, if the $1^{st}$ resource index is 0, the $2^{nd}$ resource index may be predetermined to 5, and if the $1^{st}$ resource index is 1, the $2^{nd}$ resource index may be predetermined to 6. When the BS signals only a value 0 or 1 as the $1^{st}$ resource index, the UE may obtain a value 5 or 6 as the $2^{nd}$ resource index from the $1^{st}$ resource index.

Hereinafter, a method of obtaining the $1^{st}$ resource index and the $2^{nd}$ resource index by the UE will be described in case of dynamic ACKNACK transmission.

The UE may implicitly obtain the $1^{st}$ resource index from the $1^{st}$ CCE index used for PDCCH transmission with respect to PDSCH similarly to 3GPP LTE(Release 8). The $2^{nd}$ resource index may be explicitly reported by the BS. As a method of explicitly reporting the $2^{nd}$ resource index, signaling of a physical layer or signaling of a higher layer (e.g., RRC) of the physical layer may be used. For the physical layer signaling, the PDCCH may include an information field indicating the $2^{nd}$ resource index.

First, the UE may implicitly know the $1^{st}$ resource index from the $1^{st}$ CCE index used for PDCCH transmission. Further, the UE may know the $2^{nd}$ resource index by using RRC signaling.

Second, the UE may know the $1^{st}$ resource index from the $1^{st}$ CCE index used for PDCCH transmission. Further, the UE may know the $2^{nd}$ resource index by using an information field included in the PDCCH.

By using this method, signaling is prevented from being performed on all resource indices, thereby decreasing signaling overhead. In addition, the method allows coexistence with the legacy UE to which 3GPP LTE is applied.

In case of single-antenna transmission, it is assumed that 18 UEs can be multiplexed for one RB. In this case, if the SBC information transmission method is used for 2 Tx antennas, 9 UEs can be multiplexed for one RB. In case of the PUCCH formats 1/1a/1b, the same control information is transmitted in a $1^{st}$ slot and a $2^{nd}$ slot. An RB allocated to the PUCCH is hopped in a slot level. That is, since the information is transmitted using different subcarriers over time, a frequency diversity gain can be obtained. However, if the diversity gain can be obtained sufficiently by using the SBC information transmission method, it is not necessary to transmit the same information in the $1^{st}$ slot and the $2^{nd}$ slot. Therefore, different information may be transmitted in the $1^{st}$ slot and the $2^{nd}$ slot. In this case, UE multiplexing capacity of 2-antenna transmission may be maintained to be the same as UE multiplexing capacity of single-antenna transmission. For example, if 18 UEs are multiplexed for one RB in case of single-antenna transmission, 18 UE can be multiplexed for one RB even in case of 2-antenna transmission.

Figure 20:
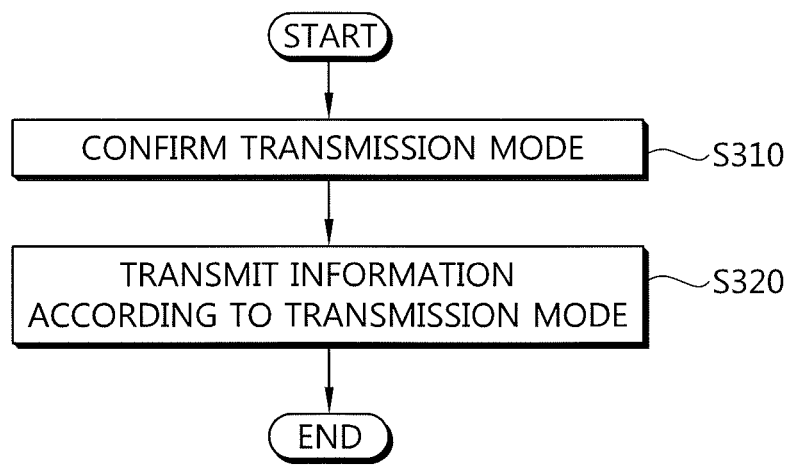
FIG. 20 is a flowchart showing an information transmission method according to another embodiment of the present invention.

FIG. 20 is a flowchart showing an information transmission method according to another embodiment of the present invention.

Referring to FIG. 20, a UE confirms a transmission mode (step S310). The transmission mode may indicate either single-antenna transmission or multiple-antenna transmission. The UE transmits information according to the transmission mode, and if the transmission mode indicates the multiple-antenna transmission, transmits the information by using the SBC information transmission method (step S320).

The transmission mode of the UE is adaptable according to a channel condition or a traffic load condition. The transmission mode may be semi-statically determined. The transmission mode may be determined by a higher layer such as an RRC layer. For example, a $1^{st}$ UE in a poor channel environment may perform multiple-antenna transmission, and a $2^{nd}$ UE in a good channel environment may perform single-antenna transmission. Alternatively, single-antenna transmission may be performed if a great number of UEs are multiplexed to the same time resource, and multiple-antenna transmission may be performed if a relatively small number of UEs are multiplexed. Therefore, the SBC information transmission method may also apply in an adaptive manner according to the transmission mode of the UE.

The SBC information transmission method can be extendedly applied to three or more Tx antennas. As to the three or more Tx antennas, this method may be applied by combining with a different Tx diversity scheme. Examples of the different Tx diversity scheme include CDD, PVS, frequency switched transmit diversity (FSTD), time switched transmit diversity (TSTD), etc. For example, when using 4 Tx antennas, the antennas are divided into a $1^{st}$ group including 2 Tx antennas and a $2^{nd}$ group including 2 Tx antennas. The SBC information transmission method may be applied to each group, and a different Tx diversity scheme may be applied to each group.

Hereinafter, for convenience of explanation, a Tx matrix is described focusing on the example (1) of Table 14 when using 2 Tx antennas.

A Tx matrix similar to the example (1) of Table 14 is generated based on an Alamouti code from $1^{st}$ and $2^{nd}$ symbols $s_1$ and $s_2$ corresponding to information.

A $1^{st}$ receive (Rx) signal for a $1^{st}$ resource index is denoted by $y_1$, and a $2^{nd}$ Rx signal for a $2^{nd}$ resource index is denoted by $y_2$. An actual Rx signal y is received by combining the $1^{st}$ Rx signal $y_1$ and the $2^{nd}$ Rx signal $y_2$ ($y=y_1+y_2$). However, it is assumed that the Rx signal y can be split into the $1^{st}$ Rx signal $y_1$ and the $2^{nd}$ Rx signal $y_2$ by using a de-spreading operation. For convenience of explanation, it is assumed that the number of Rx antennas of a receiver is one.

An Rx signal matrix can be expressed by Equation 9 below.

$$\begin{bmatrix} y_1 \\ y_2 \end{bmatrix} = \begin{bmatrix} s_1 & s_2 \\ -s_2^* & s_1^* \end{bmatrix} \begin{bmatrix} h_1 \\ h_2 \end{bmatrix} + \begin{bmatrix} n_1 \\ n_2 \end{bmatrix} \qquad \text{[Equation 9]}$$

In Equation 9, $h_1$ denotes a channel for a $1^{st}$ Tx antenna, $h_2$ denotes a channel for a $2^{nd}$ Tx antenna, $n_1$ denotes noise of a $1^{st}$ Rx signal, and $n_2$ is noise of a $2^{nd}$ Rx signal. Herein, the noise may be additive white Gaussian noise (AWGN).

Equation 9 can be equivalently expressed by Equation 10 below.

$$\begin{bmatrix} y_1 \\ y_2^* \end{bmatrix} = \begin{bmatrix} h_1 & h_2 \\ h_2^* & -h_1^* \end{bmatrix} \begin{bmatrix} s_1 \\ s_2 \end{bmatrix} + \begin{bmatrix} n_1 \\ n_2^* \end{bmatrix} \qquad \text{[Equation 10]}$$

Equation 10 can be modified to Equation 11 below.

$$\begin{aligned}
\begin{bmatrix} h_1 & h_2 \\ h_2^* & -h_1^* \end{bmatrix}^H \begin{bmatrix} y_1 \\ y_2^* \end{bmatrix} &= \begin{bmatrix} h_1 & h_2 \\ h_2^* & -h_1^* \end{bmatrix}^H \begin{bmatrix} h_1 & h_2 \\ h_2^* & -h_1^* \end{bmatrix} \begin{bmatrix} s_1 \\ s_2 \end{bmatrix} + \begin{bmatrix} h_1 & h_2 \\ h_2^* & -h_1^* \end{bmatrix}^H \begin{bmatrix} n_1 \\ n_2^* \end{bmatrix} \\
&= \begin{bmatrix} |h_1|^2 + |h_2|^2 & 0 \\ 0 & |h_1|^2 + |h_2|^2 \end{bmatrix} \begin{bmatrix} s_1 \\ s_2 \end{bmatrix} + \begin{bmatrix} n_1' \\ n_2' \end{bmatrix}
\end{aligned} \qquad \text{[Equation 11]}$$

In Equation 11, $(\cdot)^H$ denotes a Hermitian matrix. The $1^{st}$ symbol $s_1$ and the $2^{nd}$ symbol $s_2$ are orthogonally separated. The receiver can obtain a diversity gain expressed by Equation 12 below.

$$|h_1|^2 + |h_2|^2 \qquad \text{[Equation 12]}$$

The diversity gain is similar to maximal ratio coding (MRC) which is optimal combining. The MRC scheme is one of signal combining schemes for estimating a Tx signal from an Rx signal received from a plurality of Rx antennas.

First, a case where each of $1^{st}$ and $2^{nd}$ symbols is one complex-valued symbol will be described according to $1^{st}$ to $4^{th}$ embodiments. The $1^{st}$ symbol is denoted by $d_1(0)$, and the $2^{nd}$ symbol is denoted by $d_2(0)$. A $1^{st}$ Tx vector includes a $1^{st}$ Tx symbol $d_1(0)$ and a $2^{nd}$ Tx symbol $-d_2(0)^*$, and the $2^{nd}$ Tx vector includes a $3^{rd}$ Tx symbol $d_2(0)$ and a $4^{th}$ Tx symbol $d_1(0)^*$.

In the $1^{st}$ and $2^{nd}$ embodiments, a resource used for information transmission consists of only a sequence. In this case, a resource index includes a sequence index indicating the sequence. The sequence may be a frequency-domain sequence or a time-domain sequence. A $1^{st}$ resource index and a $2^{nd}$ resource index include different sequence indices.

An $m^{th}$ sequence having a spreading factor K=N indicated by an $m^{th}$ resource index is denoted by $[w_m(0), w_m(1), \ldots, w_m(N-1)]$ (where N is a natural number, m=1,2). An $r^{th}$ Tx sequence is denoted by $[z_r(0), z_r(1), \ldots, z_r(N-1)]$ (where l=1, 2, 3, 4). A $1^{st}$ Tx sequence $z_1$ to a $4^{th}$ Tx sequence $z_4$ can be expressed by Equation 13 below.

$$\begin{aligned}
z_1(k) &= d_1(0) \cdot w_1(k) \\
z_2(k) &= -d_2(0)^* \cdot w_2(k) \\
z_3(k) &= d_2(0) \cdot w_1(k) \\
z_4(k) &= d_1(0)^* \cdot w_2(k)
\end{aligned} \qquad \text{[Equation 13]}$$

In Equation 13, k=0, 1, 2, ..., N−1.

If a sequence indicated by a sequence index included in a resource index is a frequency-domain sequence, a Tx sequence is mapped to a frequency domain. If the sequence is a time-domain sequence, the Tx sequence is mapped to a time domain.

Therefore, an $r^{th}$ Tx sequence may be mapped either to the time domain or the frequency domain. When it is mapped to the frequency domain, the $r^{th}$ spread sequence may be mapped to N subcarriers. When it is mapped to the time domain, the $r^{th}$ spread sequence may be mapped to N time samples, N chips, or N OFDM symbols.

A $1^{st}$ Tx sequence and a $2^{nd}$ Tx sequence are transmitted through a $1^{st}$ antenna. A $3^{rd}$ Tx sequence and a $4^{th}$ Tx sequence are transmitted through a $2^{nd}$ antenna.

1. $1^{st}$ Embodiment

The $1^{st}$ embodiment shows a case where a Walsh-Hadamard matrix is used as a sequence.

Equation 14 below shows a 4×4 Walsh-Hadamard matrix.

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 14]}$$

Each of four rows of the Walsh-Hadamard matrix constitutes an orthogonal sequence. That is, four orthogonal sequences [1, 1, 1, 1], [1, −1, 1, −1], [1, 1, −1, −1], and [1, −1, −1, 1] can be defined. Although three orthogonal sequences are used by excluding [1, 1, −1, —1] in 3GPP LTE (see Table 3), it is also possible to use [1, 1, −1, −1] as the sequence.

In an example described hereinafter, a $1^{st}$ orthogonal sequence indicated by the $1^{st}$ resource index is [1, 1, 1, 1], and a $2^{nd}$ orthogonal sequence indicated by the $2^{nd}$ resource index is [1, −1, 1, −1].

The $1^{st}$ Tx sequence transmitted through the $1^{st}$ antenna is $[d_1(0), -d_1(0), d_1(0), -d_1(0)]$, and the $2^{nd}$ Tx sequence is $[-d_2(0)^*, -d_2(0)^*, d_2(0)^*, d_2(0)^*]$. The $3^{rd}$ Tx sequence transmitted through the $2^{nd}$ antenna is $[d_2(0), -d_2(0), d_2(0), -d_2(0)]$, and the $4^{th}$ Tx sequence is $[d_1(0)^*, d_1(0)^*, -d_1(0)^*, -d_1(0)^*]$. When Rx signals are denoted by y=[y(0), y(1), y(2), y(3)], each Rx signal can be expressed by Equation 15 below.

$$y(0) = \{d_1(0) - d_2(0)^*\}h_1 + \{d_2(0) + d_1(0)^*\}h_2 + n(0)$$

$$y(1) = \{-d_1(0) - d_2(0)^*\}h_1 + \{-d_2(0) + d_1(0)^*\}h_2 + n(1)$$

$$y(2) = \{d_1(0) + d_2(0)^*\}h_1 - \{-d_2(0) - d_1(0)^*\}h_2 + n(2)$$

$$y(3) = \{-d_1(0) - d_2(0)^*\}h_1 + \{-d_2(0) + d_1(0)^*\}h_2 + n(3) \quad \text{[Equation 15]}$$

Two estimation symbols can be generated by performing de-spreading on each of two resource indices from the Rx signal. When $d'_m(0)$ denotes an $m^{th}$ estimation symbol which is de-spread with respect to an $m^{th}$ resource index, it can be expressed by Equation 16 below ((m=1,2).

$$d'_m(0) = \sum_{k=0}^{N-1} y(k) \cdot (w_m(k))^* \quad \text{[Equation 16]}$$

In Equation 16, N denotes a sequence length, and $w_m(k)$ denotes a $k^{th}$ element of an $m^{th}$ sequence.

When $d'_1(0)$ denotes a $1^{st}$ estimation symbol which is de-spread by using a $1^{st}$ sequence from the Rx signal and $d'_2(0)$ denotes a $2^{nd}$ estimation symbol which is de-spread by using a $2^{nd}$ sequence from the Rx signal, they can be expressed by Equation 17 below.

$$d'_1 = y(o) - y(1) + y(2) - y(3) = \quad \text{[Equation 17]}$$

$$[\{d_1(0) - d_2(0)^*\}h_1 + \{d_2(0) + d_1(0)^*\}h_2 + n(0)] -$$

$$[\{-d_1(0) - d_2(0)^*\}h_1 + \{-d_2(0) + d_1(0)^*\}h_2 +$$

$$n(1)] + [\{d_1(0) + d_2(0)^*\}h_1 +$$

$$\{d_2(0) - d_1(0)^*\}h_2 + n(2)] - [$$

$$\{-d_1(0) + d_2(0)^*\}h_1 + \{-d_2(0) - d_1(0)^*\}h_2 +$$

$$n(3)] = 4d_1(0)h_1 + 4d_2(0)h_2 + n_1$$

$$d'_2(0) = y(0) + y(1) - y(2) - y(3) = [\{d_1(0) - d_2(0)^*\}h_1 +$$

$$\{d_2(0) + d_1(0)^*\}h_2 + n(0)] +$$

$$[\{-d_1(0) - d_2(0)^*\}h_1 + \{-d_2(0) + d_1(0)^*\}$$

$$h_2 + n(1)] - [\{d_1(0) + d_2(0)^*\}h_1 +$$

$$\{d_2(0) - d_1(0)^*\}h_2 + n(2)] -$$

$$[\{-d_1(0) + d_2(0)^*\}h_1 +$$

$$\{-d_2(0) - d_1(0)^*\}h_2 + n(3)] =$$

$$-4d_2(0)^*h_1 + 4d_1(0)^*h_2 + n_2$$

Equation 17 can be expressed by a matrix of Equation 18 below.

$$\begin{bmatrix} d'_1(0) \\ d'_2(0) \end{bmatrix} = 4 \begin{bmatrix} d_1(0) & d_2(0) \\ -d_2(0)^* & d_1(0)^* \end{bmatrix} \begin{bmatrix} h_1 \\ h_2 \end{bmatrix} + \begin{bmatrix} n_1 \\ n_2 \end{bmatrix} \quad \text{[Equation 18]}$$

Equation 18 can be modified to Equation 19 below.

$$\begin{bmatrix} d'_1(0) \\ d'_2(0)^* \end{bmatrix} = 4 \begin{bmatrix} h_1 & h_2 \\ h_2^* & -h_1^* \end{bmatrix} \begin{bmatrix} d_1(0) \\ d_2(0) \end{bmatrix} + \begin{bmatrix} n_1 \\ n_2^* \end{bmatrix} \quad \text{[Equation 19]}$$

A $1^{st}$ symbol $d_1(0)$ and a $2^{nd}$ symbol $d_2(0)$ can be detected by using Equation 20 below.

$$\begin{bmatrix} h_1 & h_2 \\ h_2^* & -h_1^* \end{bmatrix}^H \begin{bmatrix} d'_1(0) \\ d'_2(0)^* \end{bmatrix} = \quad \text{[Equation 20]}$$

$$4 \begin{bmatrix} |h_1|^2 + |h_2|^2 & 0 \\ 0 & |h_1|^2 + |h_2|^2 \end{bmatrix} \begin{bmatrix} d_1(0) \\ d_2(0) \end{bmatrix} \begin{bmatrix} n''_1 \\ n''_2 \end{bmatrix}$$

In this manner, the diversity gain is obtained.

2. $2^{nd}$ Embodiment

The $1^{st}$ embodiment is a case where a discrete Fourier transform (DFT) code is used as a sequence. The use of the DFT code is equivalent to a cyclic shift in a different domain. That is, the use of the DFT code in a time domain is equivalent to a cyclic shift in a frequency domain. In addition, the use of the DFT code in the frequency domain is equivalent to a cyclic shift in the time domain.

Equation 21 below shows a 4×4 DFT code matrix.

$$\begin{bmatrix} 1 & e^{j2\pi \cdot 1 \cdot 0/4} & e^{j2\pi \cdot 2 \cdot 0/4} & e^{j2\pi \cdot 3 \cdot 0/4} \\ 1 & e^{j2\pi \cdot 1 \cdot 1/4} & e^{j2\pi \cdot 2 \cdot 1/4} & e^{j2\pi \cdot 3 \cdot 1/4} \\ 1 & e^{j2\pi \cdot 1 \cdot 2/4} & e^{j2\pi \cdot 2 \cdot 2/4} & e^{j2\pi \cdot 3 \cdot 2/4} \\ 1 & e^{j2\pi \cdot 1 \cdot 3/4} & e^{j2\pi \cdot 2 \cdot 3/4} & e^{j2\pi \cdot 3 \cdot 3/4} \end{bmatrix} \quad \text{[Equation 21]}$$

Each of four rows of the DFT code matrix constitutes an orthogonal sequence. That is, 4 sequences having a length of 4 can be defined from the DFT code matrix.

Hereinafter, a case where a $1^{st}$ sequence $w_1$ and a $2^{nd}$ sequence $w_2$ are defined by Equation 22 will be described for example.

$$w_1 = [1, e^{j2\pi \cdot 1 \cdot 1/4}, e^{j2\pi \cdot 2 \cdot 1/4}, e^{j2\pi \cdot 3 \cdot 1/4}]$$

$$w_2 = [1, e^{j2\pi \cdot 1 \cdot 2/4}, e^{j2\pi \cdot 2 \cdot 2/4}, e^{j2\pi \cdot 3 \cdot 2/4}] \quad \text{[Equation 22]}$$

A $1^{st}$ Tx sequence $z_1$ to a $4^{th}$ Tx sequence $z_4$ can be expressed by Equation 23 below.

$$z_1 = [d_1(0), d_1(0)e^{j2\pi \cdot 1 \cdot 1/4}, d_1(0)e^{j2\pi \cdot 2 \cdot 1/4}, d_1(0)e^{j2\pi \cdot 3 \cdot 1/4}]$$

$$z_2 = [-d_2(0)^*, -d_2(0)^* e^{j2\pi \cdot 1 \cdot 2/4}, -d_2(0)^* e^{j2\pi \cdot 2 \cdot 2/4}, -d_2(0)^* e^{j2\pi \cdot 3 \cdot 2/4}]$$

$$z_3 = [d_2(0), d_2(0)e^{j2\pi \cdot 1 \cdot 1/4}, d_2(0)e^{j2\pi \cdot 2 \cdot 1/4}, d_2(0)e^{j2\pi \cdot 3 \cdot 1/4}]$$

$$z_4 = [d_1(0)^*, d_1(0)^* e^{j2\pi \cdot 1 \cdot 2/4}, d_1(0)^* e^{j2\pi \cdot 2 \cdot 2/4}, d_1(0)^* e^{j2\pi \cdot 3 \cdot 2/4}] \quad \text{[Equation 23]}$$

When $d'_1(0)$ denotes a $1^{st}$ estimation symbol which is de-spread with respect to the $1^{st}$ sequence $w_1$ and $d'_2(0)$ denotes a $2^{nd}$ estimation symbol which is de-spread with respect to the $2^{nd}$ sequence $w_2$, they can be expressed by Equation 24 below.

$$d'_1(0) = 4d_1(0)h_1 + 4d_2(0)h_2 + n_1$$

$$d'_2(0) = -4d_2(0)^* h_1 + 4d_1(0)^* h_2 + n_2 \quad \text{[Equation 24]}$$

By using Equation 24, a $1^{st}$ symbol $d_1(0)$ and a $2^{nd}$ symbol $d_2(0)$ can be detected by Equation 25 below.

$$\begin{bmatrix} h_1 & h_2 \\ h_2^* & -h_1^* \end{bmatrix}^H \begin{bmatrix} d'_1(0) \\ d'_2(0)^* \end{bmatrix} = \quad \text{[Equation 25]}$$

$$4 \begin{bmatrix} |h_1|^2 + |h_2|^2 & 0 \\ 0 & |h_1|^2 + |h_2|^2 \end{bmatrix} \begin{bmatrix} d_1(0) \\ d_2(0) \end{bmatrix} + \begin{bmatrix} n'_1 \\ n'_2 \end{bmatrix}$$

In this manner, the diversity gain is obtained.

3. $3^{rd}$ Embodiment

The $3^{rd}$ embodiment is a case where a resource used for information transmission consists of a time-domain sequence and a frequency-domain sequence. In this case, a resource index includes a time-domain sequence index and a frequency-domain sequence index. The time-domain sequence and the frequency-domain sequence allow a Tx symbol to be spread to a 2 dimensional (2D) domain, i.e., a time-frequency domain. It is assumed in the $3^{rd}$ embodiment that the time-domain sequence is one orthogonal sequence selected from a set of orthogonal sequences, and the frequency-domain sequence is a cyclically shifted sequence generated by cyclically shifting a base sequence by a cyclic shift (CS) amount. However, this is for exemplary purposes only, and thus the time-domain sequence and/or the frequency-domain sequence are not limited thereto. The time-domain sequence index may be an orthogonal sequence (OS) index, and the frequency-domain sequence may be a CS index indicating the CS amount.

A $1^{st}$ resource index and a $2^{nd}$ resource index include a different frequency-domain sequence index or a different time-domain sequence.

An $r^{th}$ Tx sequence $z_r$ ($r=1, 2, 3, 4$) can be expressed in the 2D domain, i.e., the time-frequency domain, by Equation 26 below.

$$\begin{bmatrix} z_r(0,0) & z_r(0,1) & z_r(0,2) & z_r(0,3) \\ z_r(1,0) & z_r(1,1) & z_r(1,2) & z_r(1,3) \\ \vdots & \vdots & \vdots & \vdots \\ z_r(11,0) & z_r(11,1) & z_r(11,2) & z_r(11,3) \end{bmatrix} \quad \text{[Equation 26]}$$

Herein, each row may correspond to a subcarrier, and each column may correspond to an OFDM symbol. Each element of the matrix may be mapped to a resource element of an RB used in information transmission. Although the matrix consists of 12 rows and 4 columns herein, this is for exemplary purposes only, and thus the number of rows and the number of columns of the matrix are not limited thereto.

The $1^{st}$ Tx sequence $z_1$ to the $4^{th}$ Tx sequence $z_4$ can be expressed by Equation 27 below.

$$z_1(n,k) = w_1(k)d_1(0)r(n, Ics^1)$$

$$z_2(n,k) = w_2(k)(-d_1(0)^*)r(n, Ics^2)$$

$$z_3(n,k) = w_1(k)d_2(0)r(n, Ics^1)$$

$$z_4(n,k) = w_2(k)d_1(0)^* r(n, Ics^2) \quad \text{[Equation 27]}$$

In Equation 27, k denotes a symbol index of an OFDM symbol. Except for an OFDM symbol on which an RS is carried, k may be set to k=0, 1, 2, 3. n denotes a subcarrier index (n=0, 1, . . . , 11). $w_m(k)$ denotes a $k^{th}$ element of an $m^{th}$ OS index, $Ics^m$ denotes an $m^{th}$ CS index, and $r(n, Ics^m)$ denotes an $m^{th}$ cyclically shifted sequence (m=1,2).

The $3^{rd}$ embodiment can consider three cases, i.e., (1) a case where $1^{st}$ and $2^{nd}$ frequency-domain sequence indices are different from each other and $1^{st}$ and $2^{nd}$ time-domain sequence indices are identical to each other, (2) a case where the $1^{st}$ and $2^{nd}$ frequency-domain sequence indices are different from each other and the $1^{st}$ and $2^{nd}$ time-domain sequence indices are different from other, and (3) a case where the $1^{st}$ and $2^{nd}$ frequency-domain sequence indices are identical to each other and the $1^{st}$ and $2^{nd}$ time-domain sequence indices are different from each other. Each of the three cases will be described below.

(1) The case where the $1^{st}$ and $2^{nd}$ frequency-domain sequence indices are different from each other and the $1^{st}$ and $2^{nd}$ time-domain sequence indices are identical to each other.

For example, it is assumed that the $1^{st}$ resource index indicates 0 as the $1^{st}$ frequency-domain sequence index, and indicates [1, 1, 1, 1] as the $1^{st}$ time-domain sequence. In addition, it is assumed that the $2^{nd}$ resource index indicates 2 as the $2^{nd}$ frequency-domain sequence, and indicates [1, 1, 1, 1] as the $2^{nd}$ time-domain sequence.

The $1^{st}$ Tx sequence $z_1$ to the $4^{th}$ Tx sequence $z_4$ can be expressed by Equation 28 below.

$$z_1(n, k) = w_1(k) \cdot d_1(0) \cdot r(n) \cdot \exp\left(\frac{j2\pi \cdot 0 \cdot n}{12}\right) \quad \text{[Equation 28]}$$

$$z_2(n, k) = w_2(k) \cdot (-d_2(0)^*) \cdot r(n) \cdot \exp\left(\frac{j2\pi \cdot 2 \cdot n}{12}\right)$$

$$z_3(n, k) = w_1(k) \cdot d_2(0) \cdot r(n) \cdot \exp\left(\frac{j2\pi \cdot 0 \cdot n}{12}\right)$$

$$z_4(n, k) = w_2(k) \cdot d_1(0)^* \cdot r(n) \cdot \exp\left(\frac{j2\pi \cdot 2 \cdot n}{12}\right)$$

In Equation 28, r(n) is a base sequence.

An Rx signal y(n,k) can be expressed by Equation 29 below (where $0 \leq n \leq 11$, $0 \leq k \leq 3$, n and k are integers).

$$y(n,k) = (z_1(n,k) + z_2(n,k))h_1 + (z_3(n,k) + z_4(n,k))h_2 + n(n,k) \quad \text{[Equation 29]}$$

When $d'_1(0)$ denotes a $1^{st}$ estimation symbol which is de-spread with respect to the $1^{st}$ resource index from the Rx signal and $d'_2(0)$ denotes a $2^{nd}$ estimation symbol which is de-spread with respect to the $2^{nd}$ resource index from the Rx signal, they can be expressed by Equation 30 below.

$$d'_1(0)=48d_1(0)h_1+48d_2(0)h_2+n_1$$

$$d'_2(0)=-48d_2(0)^*h_1+48d_1(0)^*h_2+n_2 \qquad \text{[Equation 30]}$$

In Equation 30, if de-spreading is performed on a cyclic shift, a simple frequency coherent detector can be used, or an IFFT-based maximum likelihood (ML) detector can be used.

Equation 30 can be expressed by a matrix of Equation 31 below.

$$\begin{bmatrix} d'_1(0) \\ d'_2(0) \end{bmatrix} = 48 \begin{bmatrix} d_1(0) & d_2(0) \\ -d_2(0)^* & d_1(0)^* \end{bmatrix} \begin{bmatrix} h_1 \\ h_2 \end{bmatrix} + \begin{bmatrix} n_1 \\ n_2 \end{bmatrix} \qquad \text{[Equation 31]}$$

A $1^{st}$ symbol $d_1(0)$ and a $2^{nd}$ symbol $d_2(0)$ can be detected by Equation 32 below.

$$\begin{bmatrix} h_1 & h_2 \\ h_2^* & -h_1^* \end{bmatrix}^H \begin{bmatrix} d'_1(0) \\ d'_2(0)^* \end{bmatrix} =$$

$$48 \begin{bmatrix} |h_1|^2+|h_2|^2 & 0 \\ 0 & |h_1|^2+|h_2|^2 \end{bmatrix} \begin{bmatrix} d_1(0) \\ d_2(0) \end{bmatrix} \begin{bmatrix} n'_1 \\ n'_2 \end{bmatrix} \qquad \text{[Equation 32]}$$

In this manner, the diversity gain is obtained.

(2) The case where the $1^{st}$ and $2^{nd}$ frequency-domain sequence indices are different from each other and the $1^{st}$ and $2^{nd}$ time-domain sequence indices are different from other.

For example, it is assumed that the $1^{st}$ resource index indicates 0 as the $1^{st}$ frequency-domain sequence index, and indicates [1, 1, 1, 1] as the $1^{st}$ time-domain sequence. In addition, it is assumed that the $2^{nd}$ resource index indicates 2 as the $2^{nd}$ frequency-domain sequence, and indicates [1, −1, 1, −1] as the $2^{nd}$ time-domain sequence.

The same diversity gain as the case (1) where the $1^{st}$ and $2^{nd}$ frequency-domain sequence indices are different from each other and the $1^{st}$ and $2^{nd}$ time-domain sequence indices are identical to each other can also be obtained.

(3) The case where the $1^{st}$ and $2^{nd}$ frequency-domain sequence indices are identical to each other and the $1^{st}$ and $2^{nd}$ time-domain sequence indices are different from each other.

For example, it is assumed that the $1^{st}$ resource index indicates 0 as the $1^{st}$ frequency-domain sequence index, and indicates [1, 1, 1, 1] as the $1^{st}$ time-domain sequence. In addition, it is assumed that the $2^{nd}$ resource index indicates 0 as the $2^{nd}$ frequency-domain sequence, and indicates [1, −1, 1, −1] as the $2^{nd}$ time-domain sequence.

The same diversity gain as the case (1) where the $1^{st}$ and $2^{nd}$ frequency-domain sequence indices are different from each other and the $1^{st}$ and $2^{nd}$ time-domain sequence indices are identical to each other can also be obtained.

4. $4^{th}$ Embodiment

The $4^{th}$ embodiment is a case where a resource used for information transmission consists of a time-domain sequence, a frequency-domain sequence, and an RB. In this case, a resource index includes a time-domain sequence index, a frequency-domain sequence index, and RB information. Similarly to the $3^{rd}$ embodiment, it is assumed in the $4^{th}$ embodiment that the time-domain sequence is one orthogonal sequence selected from a set of orthogonal sequences, and the frequency-domain sequence is a cyclically shifted sequence generated by cyclically shifting a base sequence by a CS amount. However, this is for exemplary purposes only, and thus the time-domain sequence and/or the frequency-domain sequence are not limited thereto. The time-domain sequence index may be an OS index, and the frequency-domain sequence may be a CS index indicating the CS amount.

A $1^{st}$ resource index and a $2^{nd}$ resource index include a different frequency-domain sequence index or a different time-domain sequence.

A $1^{st}$ Tx sequence $z_1$ to a $4^{th}$ Tx sequence $z_4$ can be expressed by Equation 33 below.

$$z_1(n+R_1,k)=w_1(k)d_1(0)r(n,Ics^1)$$

$$z_2(n+R_2,k)=w_2(k)(-d_2(0)^*)r(n,Ics^1)$$

$$z_3(n+R_1,k)=w_1(k)d_2(0)r(n,Ics^1)$$

$$z_4(n+R_2,k)=w_2(k)d_1(0)r(n,Ics^2) \qquad \text{[Equation 33]}$$

In Equation 33, k denotes a symbol index of an OFDM symbol in an $m^{th}$ RB. Except for an OFDM symbol on which an RS is carried, k may be set to k=0, 1, 2, 3. $R_m$ denotes a frequency position offset of the $m^{th}$ RB, and n denotes a subcarrier index in the $m^{th}$ RB (where n=0, 1, ..., 11). $w_m(k)$ denotes a $k^{th}$ element of an $m^{th}$ OS index, $Ics^m$ denotes an $m^{th}$ CS index, and $r(n, Ics^m)$ denotes an $m^{th}$ cyclically shifted sequence (m=1,2).

The $1^{st}$ RB indicated by the $1^{st}$ resource index may be identical to or different from the $2^{nd}$ RB indicated by the $2^{nd}$ RB. Even if the $1^{st}$ RB and the $2^{nd}$ RB are identical to each other, orthogonality can be maintained when a $1^{st}$ CS index and a $2^{nd}$ CS index are different from each other. In addition, even if the $1^{st}$ RB and the $2^{nd}$ RB are identical to each other, orthogonality can be maintained when a $1^{st}$ OS index and a $2^{nd}$ OS index are different from each other. Therefore, the $4^{th}$ embodiment can consider two cases, i.e., (1) a case where the $1^{st}$ RB and the $2^{nd}$ RB are identical to each other, and (2) a case where the $1^{st}$ RB and the $2^{nd}$ RB are different from each other. Each of the two cases will be described below.

(1) The case where the $1^{st}$ RB and the $2^{nd}$ RB are identical to each other.

$R_1$ and $R_2$ are identical to each other ($R_1=R_2=R$). An Rx signal $y(n+R,k)$ can be expressed by Equation 34 below (where $0 \le n \le 11$, $0 \le k \le 3$, n and k are integers).

$$y(n+R,k)=(z_1(n+R,k)+z_2(n+R,k))h_1+(z_3(n+R,k)+z_4(n+R,k))h_2+n_0 \qquad \text{[Equation 34]}$$

When $d'_1(0)$ denotes a $1^{st}$ estimation symbol which is de-spread with respect to the $1^{st}$ resource index from the Rx signal and $d'_2(0)$ denotes a $2^{nd}$ estimation symbol which is de-spread with respect to the $2^{nd}$ resource index from the Rx signal, they can be expressed by Equation 35 below.

$$d'_1(0) = \sum_{k=0}^{3} \sum_{n=0}^{11} (y(n+R,n) \cdot (w_1(k)r(n, Ics^1))) \qquad \text{[Equation 35]}$$

$$d'_2(0) = \sum_{k=0}^{3} \sum_{n=0}^{11} (y(n+R,n) \cdot (w_2(k)r(n, Ics^2)))$$

For convenience of explanation, de-spreading based on simple summation is assumed herein. However, the de-spreading may be performed on an orthogonal sequence after detecting a cyclic shift by using the IFFT-based ML.

Equation 35 can be expressed by a matrix of Equation 36 below.

$$\begin{bmatrix} d'_1(0) \\ d'_2(0) \end{bmatrix} = 48 \begin{bmatrix} d_1(0) & d_2(0) \\ -d_2(0)^* & d_1(0)^* \end{bmatrix} \begin{bmatrix} h_1 \\ h_2 \end{bmatrix} + \begin{bmatrix} n_1 \\ n_2 \end{bmatrix} \quad \text{[Equation 36]}$$

A $1^{st}$ symbol $d_1(0)$ and a $2^{nd}$ symbol $d_2(0)$ can be detected by Equation 37 below.

$$\begin{bmatrix} h_1 & h_2 \\ h_2^* & -h_1^* \end{bmatrix}^H \begin{bmatrix} d'_1(0) \\ d'_2(0)^* \end{bmatrix} = \quad \text{[Equation 37]}$$

$$48 \begin{bmatrix} |h_1|^2 + |h_2|^2 & 0 \\ 0 & |h_1|^2 + |h_2|^2 \end{bmatrix} \begin{bmatrix} d_1(0) \\ d_2(0) \end{bmatrix} + \begin{bmatrix} n'_1 \\ n'_2 \end{bmatrix}$$

In this manner, the diversity gain is obtained.

(2) The case where the $1^{st}$ RB and the $2^{nd}$ RB are different from each other.

$R_1$ and $R_2$ are different from each other. Rx signals $y(n+R_1,k)$ and $y(n+R_2,k)$ can be expressed by Equation 38 below (where $0 \leq n \leq 11$, $0 \leq k \leq 3$, n and k are integers).

$$y(n+R_1,k) = z_1(n+R_1,k)h_1 + z_3(n+R_1,k)h_2 + n_1, y(n+R_2,k) = z_2(n+R_2,k)h_1 + z_4(n+R_2,k)h_2 + n_2 \quad \text{[Equation 38]}$$

When $d'_1(0)$ denotes a $1^{st}$ estimation symbol which is de-spread with respect to the $1^{st}$ resource index from the Rx signal and $d'_2(0)$ denotes a $2^{nd}$ estimation symbol which is de-spread with respect to the $2^{nd}$ resource index from the Rx signal, they can be expressed by Equation 39 below.

$$d'_1(0) = \sum_{k=0}^{3} \sum_{n=0}^{11} (y(n+R_1,n) \cdot (w_1(k)r(n, Ics^1))) \quad \text{[Equation 39]}$$

$$d'_2(0) = \sum_{k=0}^{3} \sum_{n=0}^{11} (y(n+R_2,n) \cdot (w_2(k)r(n, Ics^2)))$$

The same diversity gain as the case (1) where the $1^{st}$ RB and the $2^{nd}$ RB are identical to each other can also be obtained.

As such, the $1^{st}$ resource index may indicate the $1^{st}$ frequency-domain sequence index, the $1^{st}$ time-domain sequence index, and the $1^{st}$ RB, and the $2^{nd}$ resource index may indicate the $2^{nd}$ frequency-domain sequence index, the $2^{nd}$ time-domain sequence index, and the $2^{nd}$ RB. In the $1^{st}$ resource index and the $2^{nd}$ resource index, at least one of the RB information, the frequency-domain sequence index, and the time-domain sequence index is different. To decrease a CM, a scheduler of a BS may restrict the resource index to a case where only one of the frequency-domain sequence shift index, the time-domain sequence index, and the RB is different, for example: (1) a case where the $1^{st}$ and $2^{nd}$ time-domain sequence indices are identical to each other, the $1^{st}$ and $2^{nd}$ RBs are identical to each other, and the $1^{st}$ and $2^{nd}$ frequency-domain sequence indices are different from each other; (2) a case where the $1^{st}$ and $2^{nd}$ frequency-domain sequence indices are identical to each other, the $1^{st}$ and $2^{nd}$ RBs are identical to each other, and the $1^{st}$ and $2^{nd}$ time-domain sequence indices are different from each other; (3) a case where the $1^{st}$ and $2^{nd}$ frequency-domain sequence indices are identical to each other, the $1^{st}$ and $2^{nd}$ time-domain sequence indices are identical to each other, and the $1^{st}$ and $2^{nd}$ RBs are different from each other; (4) one of the cases (1) and (2); (5) one of the cases (1) and (3); (6) one of the cases (2) and (3); and (7) one of the cases (1), (2), and (3).

Now, a case where each of the $1^{st}$ symbol and the $2^{nd}$ symbol consists of a plurality of complex-valued symbols will be described. For example, the $1^{st}$ symbol $s_1$ may be denoted by $d_1(0), \ldots, d_1(10)$, and the $2^{nd}$ symbol $s_2$ may be denoted by $d_2(0), \ldots, d_2(10)$.

5. $5^{th}$ Embodiment

A resource used for information transmission may consist of a sequence and an RB. In this case, each resource index indicates a sequence index and an RB. It is assumed herein that the sequence is a frequency-domain sequence, and is a cyclically shifted sequence generated by cyclically shifting a base sequence by a CS amount. However, this is for exemplary purposes only, and thus the sequence is not limited thereto. The sequence index may be a CS index indicating the CS amount.

A $1^{st}$ resource index and a $2^{nd}$ resource index include different sequence indices or different RB information.

The UE determines an $m^{th}$ CS index and an $m^{th}$ RB by using an $m^{th}$ resource index (where m=1,2). An element of an $r^{th}$ spread sequence can be expressed by Equation 40 below (where r=1, 2, 3, 4).

$$z_1(n+R_1, k) = d_1(k) \cdot r(n) \cdot \exp\left(\frac{j2\pi n Ics^1}{12}\right) \quad \text{[Equation 40]}$$

$$z_2(n+R_2, k) = (-d_2(k)^*) \cdot r(n) \cdot \exp\left(\frac{j2\pi n Ics^2}{12}\right)$$

$$z_3(n+R_1, k) = d_2(k) \cdot r(n) \cdot \exp\left(\frac{j2\pi n Ics^1}{12}\right)$$

$$z_4(n+R_2, k) = d_1(k)^* \cdot r(n) \cdot \exp\left(\frac{j2\pi n Ics^2}{12}\right)$$

In Equation 40, k may be a symbol index of an OFDM symbol in an $m^{th}$ RB. Except for OFDM symbols on which an RS is carried, k may be set to k=0, 1, ..., 9. $R_m$ denotes a frequency location offset of the $m^{th}$ RB, and n denotes a subcarrier index in the $m^{th}$ RB (where n=0, 1, ..., 11). $Ics^m$ denotes an $m^{th}$ CS index, and $r(n, Ics^m)$ denotes an $m^{th}$ cyclically shifted sequence.

As such, the $1^{st}$ resource index may indicate the $1^{st}$ sequence index and the $1^{st}$ RB, and the $2^{nd}$ resource index may indicate the $2^{nd}$ sequence index and the $2^{nd}$ RB. In the $1^{st}$ resource index and the $2^{nd}$ resource index, at least one of RB information and the sequence index is different. To decrease the CM, the scheduler of the BS may restrict a resource index to: (1) a case where the $1^{st}$ and $2^{nd}$ sequence indices are different from each other and the $1^{st}$ and $2^{nd}$ RBs are identical to each other; (2) the $1^{st}$ and $2^{nd}$ sequence indices are identical to each other and the $1^{st}$ and $2^{nd}$ RBs are different from each other; and (3) one of the cases (1) and (2).

Figure 21:
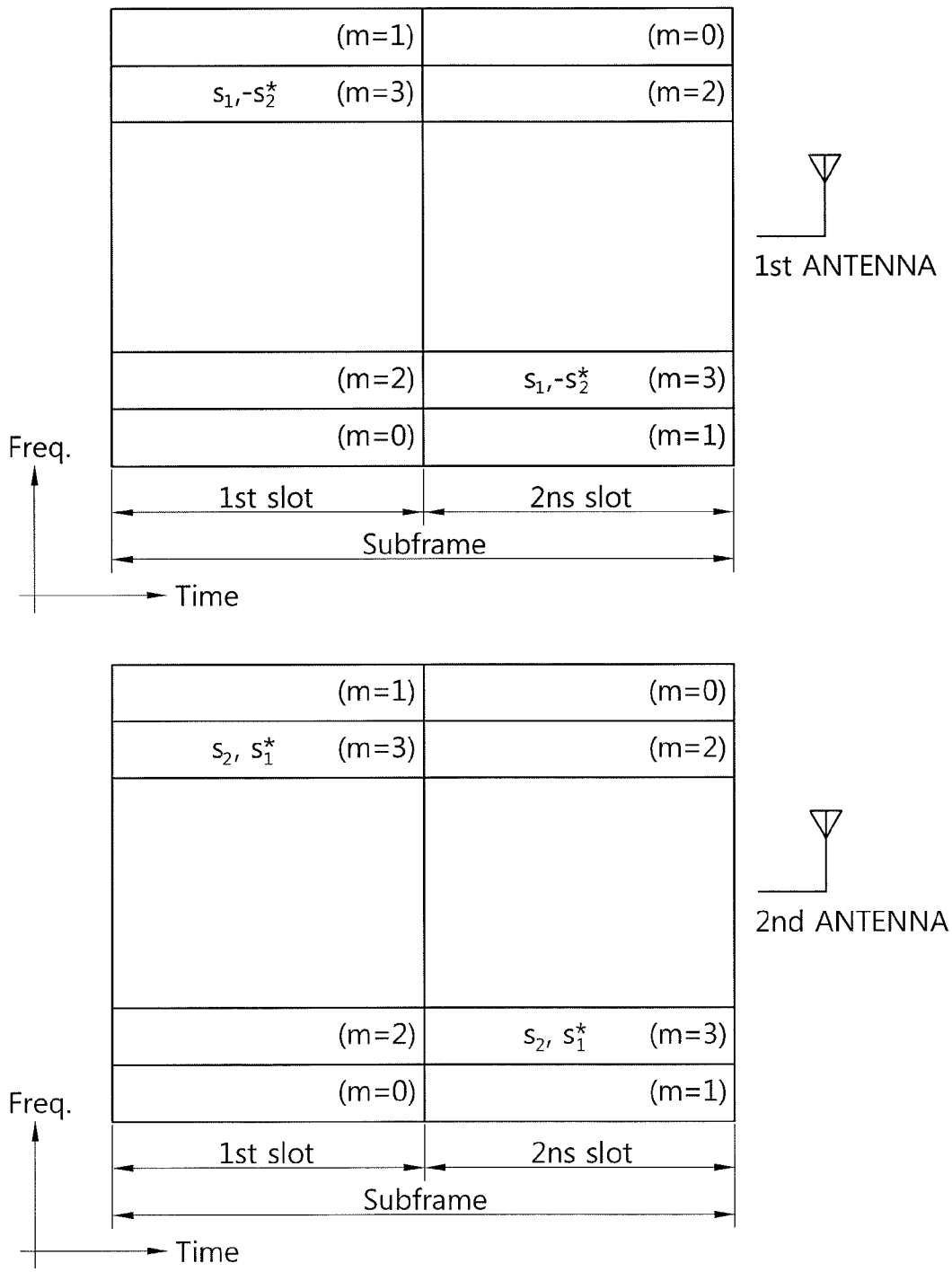
FIG. 21 shows an example of an information transmission method when a 1st RB and a 2nd RB are identical to each other.

FIG. 21 shows an example of an information transmission method when a $1^{st}$ RB and a $2^{nd}$ RB are identical to each other.

Referring to FIG. 21, the $1^{st}$ RB and the $2^{nd}$ RB are RB pairs with m=3. A $1^{st}$ Tx vector (i.e., a $1^{st}$ Tx symbol $s_1$ and a $2^{nd}$ Tx symbol $-s_2^*$) is transmitted through a $1^{st}$ antenna. A $2^{nd}$ Tx vector (i.e., a $3^{rd}$ Tx symbol $s_2$ and a $4^{th}$ Tx symbol $s_1^*$) is transmitted through a $2^{nd}$ antenna.

FIG. 22 shows an example of an information transmission method when a 1$^{st}$ RB and a 2$^{nd}$ RB are different from each other.

Referring to FIG. 22, the 1$^{st}$ RB is an RB pair with m=3, and the 2$^{nd}$ RB is an RB pair with m=0.

Figure 23:
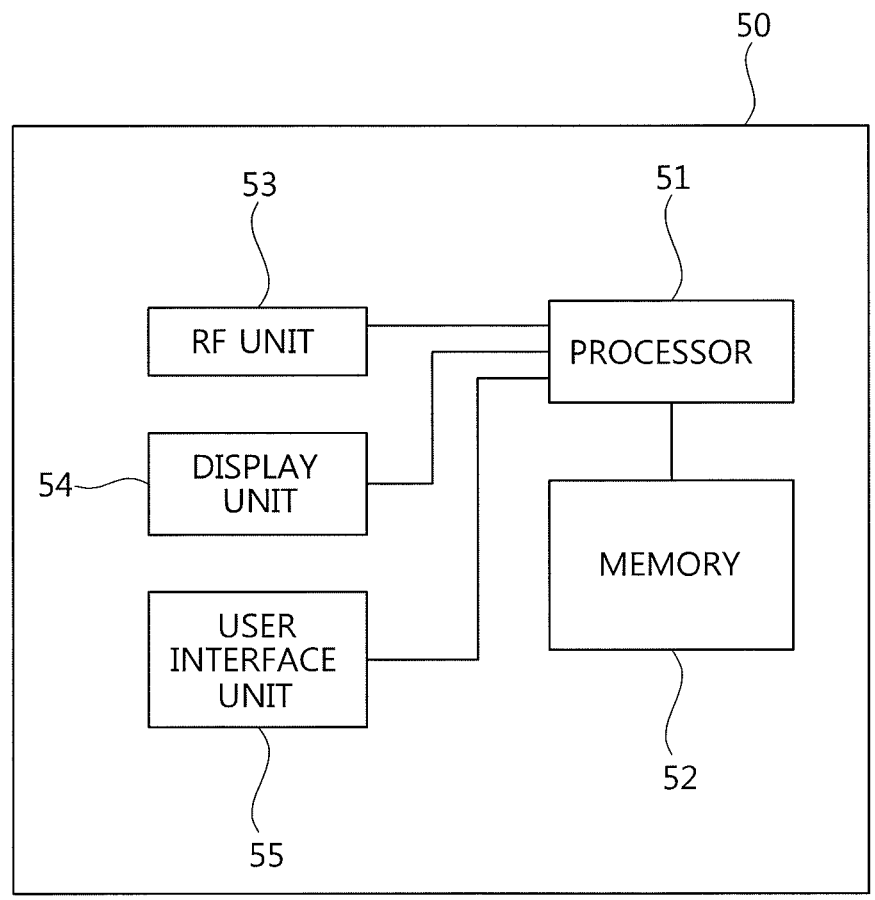
FIG. 23 is a block diagram showing an apparatus for radio communication.

FIG. 23 is a block diagram showing an apparatus for radio communication. An apparatus 50 for radio communication may be a part of a UE. The apparatus 50 includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, an application, and a general file. The display unit 54 displays a variety of information of a UE and may use a well-known element such as a liquid crystal display (LCD), an organic light emitting diode (OLED), etc. The user interface unit 55 can be configured with a combination of well-known user interfaces such as a keypad, a touch screen, etc. The block diagram of the transmitter of FIG. 18 can be implemented by the processor 51.

Figure 24:
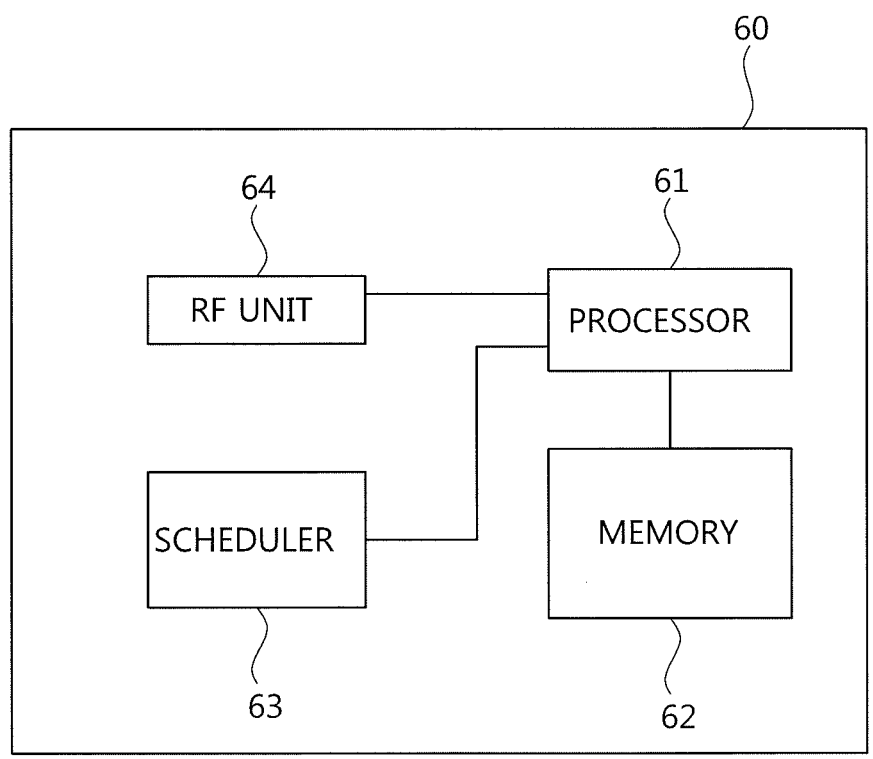
FIG. 24 is a block diagram showing an example of a BS.

FIG. 24 is a block diagram showing an example of a BS. A BS 60 includes a processor 61, a memory 62, a scheduler 63, and an RF unit 64. The RF unit 64 is coupled to the processor 61 and transmits and/or receives radio signals. The processor 61 performs all methods related to the aforementioned information processing and transmission. The memory 62 is coupled to the processor 61, and stores information processed in the processor 61. The scheduler 63 is coupled to the processor 61, and can perform all methods related to scheduling for information transmission such as the aforementioned resource index allocation. The block diagram of the transmitter of FIG. 18 can be implemented by the processor 61.

As such, a method and apparatus for effective information transmission in a radio communication system can be provided. A UE or a BS can effectively transmit information by using a Tx diversity scheme. Orthogonality can be maintained between Tx antennas. A method of effectively transmitting information while maintaining compatibility with a single-carrier system can be provided in a multiple-carrier system. In addition, additional control information can be effectively transmitted in a system supporting at least 2 codewords while satisfying backward compatibility with 3GPP LTE supporting up to 2 codewords. Accordingly, reliability of radio communication can be increased, and overall system performance can be improved.

Although the above descriptions have focused on UL information transmission, the same can also apply to DL information transmission without change. In addition, the aforementioned description can apply not only to control information transmission but also to general information transmission such as data information transmission or the like.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting, by a transmitter, information in a wireless communication system, the method comprising:
generating first and second symbols;
generating first and second transmit vectors on the basis of an Alamouti code from the first and second symbols; and
transmitting the first transmit vector through a first antenna and transmitting the second transmit vector through a second antenna,
wherein the first transmit vector consists of a first transmit symbol and a second transmit symbol, the first transmit symbol is transmitted based on a first resource index, and the second transmit symbol is transmitted based on a second resource index,
wherein the second transmit vector consists of a third transmit symbol and a fourth transmit symbol, the third transmit symbol is transmitted based on the first resource index, and the fourth transmit symbol is transmitted based on the second resource index,
wherein the first symbol is a first modulation symbol for first information, and the second symbol is a second modulation symbol for second information, and
wherein the first transmit symbol is generated based on the first symbol, the second transmit symbol is generated based on the second symbol, the third transmit symbol is obtained by appending a negative sign to a complex conjugate of the second transmit symbol, and the fourth transmit symbol is a complex conjugate of the first transmit symbol.

2. The method of claim 1, wherein the first resource index or the second resource index includes a sequence index indicating a sequence, and the sequence allows a corresponding transmit symbol to be spread to a frequency domain or a time domain, and
wherein the first resource index and the second resource index include different sequence indices.

3. The method of claim 2, wherein the sequence index indicates a cyclic shift amount, and the sequence is generated by cyclically shifting a base sequence by the cyclic shift amount.

4. The method of claim 2, wherein the sequence index is one sequence index selected from a set of sequence indices, and sequences indicated by the sequence indices are orthogonal to each other.

5. The method of claim 1, wherein the first resource index or the second resource index includes resource block information indicating a resource block on which a corresponding transmit symbol is transmitted and a sequence index indicating a sequence, and the sequence allows the corresponding transmit symbol to be spread to a frequency domain and a time domain, and
wherein the first resource index and the second resource index include different resource block information or different sequence indices.

6. The method of claim 1, wherein the first resource index or the second resource index includes a frequency-domain sequence index indicating a frequency-domain sequence and a time-domain sequence index indicating a time-domain sequence,
wherein the frequency-domain sequence and the time-domain sequence allow the corresponding transmit symbol to be spread to a 2 dimensional domain of a time-frequency domain, and wherein the first resource index and the second resource index include different frequency-domain sequence indices or different time-domain sequence indices.

7. The method of claim 1, wherein the first resource index or the second resource index includes resource block information indicating a resource block on which a corresponding transmit symbol is transmitted, a frequency-domain sequence index indicating a frequency-domain sequence, and a time-domain sequence index indicating a time-domain sequence, wherein the frequency-domain sequence and the time-domain sequence allow the corresponding transmit symbol to be spread to a 2 dimensional domain of a time-frequency domain, and wherein at least one of the resource block information, the frequency-domain sequence index, and the time-domain sequence index included in each of the first resource index and the second resource index is different.

8. The method of claim 1, further comprising obtaining the first resource index and the second resource index.

9. The method of claim 1, wherein the first information and the second information are different control information.

10. A transmitter in a wireless communication system, the transmitter comprising:

a modulator configured to generate a first symbol and a second symbol by modulating an information bit stream;

a space block coding (SBC) processor configured to generate a first transmit vector consisting of a first transmit symbol and a second transmit symbol, and a second transmit vector consisting of a third transmit symbol and a fourth transmit symbol on the basis of an Alamouti code from the first and second symbols;

a first antenna configured to transmit the first transmit vector; and a second antenna configured to transmit the second transmit vector, wherein the first transmit symbol is transmitted based on a first resource index, and the second transmit symbol is transmitted based on a second resource index, wherein the third transmit symbol is transmitted based on the first resource index, and the fourth transmit symbol is transmitted based on the second resource index, and wherein the first transmit symbol is generated based on the first symbol, the second transmit symbol is generated based on the second symbol, the third transmit symbol is obtained by appending a negative sign to a complex conjugate of the second transmit symbol, and the fourth transmit symbol is a complex conjugate of the first transmit symbol.

11. The transmitter of claim 10, wherein the first resource index or the second resource index includes a sequence index indicating a sequence, and the sequence allows a corresponding transmit symbol to be spread to a frequency domain or a time domain, and wherein the first resource index and the second resource index include different sequence indices.

12. The transmitter of claim 11, wherein the sequence index indicates a cyclic shift amount, and the sequence is generated by cyclically shifting a base sequence by the cyclic shift amount.

13. The transmitter of claim 11, wherein the sequence index is one sequence index selected from a set of sequence indices, and sequences indicated by the sequence indices are orthogonal to each other.

14. The transmitter of claim 10, wherein the first resource index or the second resource index includes resource block information indicating a resource block on which a corresponding transmit symbol is transmitted and a sequence index indicating a sequence, and the sequence allows the corresponding transmit symbol to be spread to a frequency domain and a time domain, and wherein the first resource index and the second resource index include different resource block information or different sequence indices.

15. The transmitter of claim 10, wherein the first resource index or the second resource index includes a frequency-domain sequence index indicating a frequency-domain sequence and a time-domain sequence index indicating a time-domain sequence, wherein the frequency-domain sequence and the time-domain sequence allow the corresponding transmit symbol to be spread to a 2 dimensional domain of a time-frequency domain, and wherein the first resource index and the second resource index include different frequency-domain sequence indices or different time-domain sequence indices.

16. The transmitter of claim 10, wherein the first resource index or the second resource index includes resource block information indicating a resource block on which a corresponding transmit symbol is transmitted, a frequency-domain sequence index indicating a frequency-domain sequence, and a time-domain sequence index indicating a time-domain sequence, wherein the frequency-domain sequence and the time-domain sequence allow the corresponding transmit symbol to be spread to a 2 dimensional domain of a time-frequency domain, and wherein at least one of the resource block information, the frequency-domain sequence index, and the time-domain sequence index included in each of the first resource index and the second resource index is different.

* * * * *